US011653312B1

(12) United States Patent
Abotabl et al.

(10) Patent No.: US 11,653,312 B1
(45) Date of Patent: May 16, 2023

(54) POWER ADAPTATION FOR SYNCHRONIZATION SIGNAL BLOCKS

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Hung Dinh Ly, San Diego, CA (US); Huilin Xu, Temecula, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 19 days.

(21) Appl. No.: 17/508,725

(22) Filed: Oct. 22, 2021

(51) Int. Cl.
*H04W 52/38* (2009.01)
*H04W 52/24* (2009.01)
*H04W 56/00* (2009.01)

(52) U.S. Cl.
CPC ......... *H04W 52/245* (2013.01); *H04W 52/38* (2013.01); *H04W 56/001* (2013.01); *H04W 56/0095* (2013.01)

(58) Field of Classification Search
CPC . H04W 52/245; H04W 52/38; H04W 56/001; H04W 56/0095
See application file for complete search history.

(56) References Cited

U.S. PATENT DOCUMENTS

| | | | | |
|---|---|---|---|---|
| 11,394,448 | B2 * | 7/2022 | Hur | H04B 7/0695 |
| 2019/0159261 | A1 * | 5/2019 | Jung | H04W 56/001 |
| 2019/0363809 | A1 * | 11/2019 | Yoon | H04W 56/00 |
| 2020/0229092 | A1 * | 7/2020 | Wu | H04W 76/27 |
| 2020/0229117 | A1 * | 7/2020 | Abedini | H04W 72/042 |
| 2020/0252974 | A1 * | 8/2020 | Akkarakaran | H04W 52/36 |
| 2020/0382195 | A1 * | 12/2020 | Hur | H04W 16/28 |
| 2021/0037459 | A1 * | 2/2021 | Li | H04B 17/327 |
| 2021/0084510 | A1 * | 3/2021 | Ryu | H04B 17/309 |
| 2021/0212099 | A1 * | 7/2021 | Yi | H04W 72/042 |
| 2021/0282143 | A1 * | 9/2021 | Lee | H04W 52/281 |
| 2021/0360594 | A1 * | 11/2021 | Park | H04L 5/0048 |
| 2022/0046581 | A1 * | 2/2022 | He | H04W 56/001 |
| 2022/0053538 | A1 * | 2/2022 | Akkarakaran | H04B 7/0617 |
| 2022/0086769 | A1 * | 3/2022 | Guo | H04W 52/0219 |
| 2022/0209927 | A1 * | 6/2022 | Shreevastav | H04L 5/0069 |

(Continued)

FOREIGN PATENT DOCUMENTS

| | | | | |
|---|---|---|---|---|
| CA | 3070072 | A1 * | 1/2019 | H04J 11/0069 |
| CA | 3072683 | A1 * | 2/2019 | H04B 7/0695 |

*Primary Examiner* — Hai V Nguyen
(74) *Attorney, Agent, or Firm* — Holland & Hart LLP/Qualcomm Incorporated

(57) ABSTRACT

Methods, systems, and devices for wireless communication are described. A user equipment (UE) may receive an indication of a transmission power for a synchronization signal block (SSB) transmission by a base station, the indicated transmission power different than a default transmission power for SSB transmissions by the base station. The UE may determine a received power with which the SSB transmission is received at the UE. The UE may receive one or more downlink transmissions from the base station based at least in part on the received power for the SSB transmission and a difference between the default transmission power and the indicated transmission power for the SSB transmission.

30 Claims, 17 Drawing Sheets

(56) References Cited

U.S. PATENT DOCUMENTS

| | | | |
|---|---|---|---|
| 2022/0216929 A1* | 7/2022 | Matsumura | H04W 52/146 |
| 2022/0312337 A1* | 9/2022 | Lim | H04W 52/54 |
| 2022/0312349 A1* | 9/2022 | Abotabl | H04W 24/10 |
| 2022/0322297 A1* | 10/2022 | Cha | H04B 17/27 |
| 2022/0330251 A1* | 10/2022 | Xu | H04L 5/003 |
| 2022/0353892 A1* | 11/2022 | Cirik | H04W 72/1289 |

* cited by examiner

POWER ADAPTATION FOR SYNCHRONIZATION SIGNAL BLOCKS

FIELD OF TECHNOLOGY

The following relates to wireless communication, including power adaptation for synchronization signal blocks.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support power adaptation for synchronization signal blocks (SSBs). Generally, aspects of the techniques described herein provide various mechanisms for the network to conserve power for some broadcast transmissions, such as synchronization signal block (SSB) transmissions by a base station, while enabling user equipment (UE) to continue utilizing the SSB transmissions for channel performance measurement and adaptation (e.g., in support of subsequent communications with the base station). For example, the base station may include or otherwise convey an indication of the transmission power for the SSB transmissions.

For example, the base station may include a power offset indication, an indication regarding the number of antenna(s)/antenna subpanel(s) being used for the SSB transmission, or the like. In some examples, the base station may configure the UE with a set of power modes, where each power mode corresponds to a particular transmission power for the SSB transmissions, such as an absolute transmission power being used, a power offset for the SSB transmissions (e.g., with respect to a default transmission power), the antenna(s)/antenna subpanel(s), etc., being used for the SSB transmissions. In examples where the set of power modes are configured for the UE, the base station may indicate or otherwise convey an indication of the power mode being used for the SSB transmissions. Additionally, or alternatively, a base station may indicate a quantity of antenna panels/subpanels used for an SSB transmission, a power offset for an SSB transmission (e.g., through a direct indication, as opposed to an indication of a corresponding power mode), or the like.

Accordingly, the UE may receive the SSB transmissions from the base station according to the transmission power. The UE may perform subsequent downlink and/or uplink transmissions with the base station based on the SSB transmissions. For example, the UE and/or base station may select or otherwise configure parameter(s) for the subsequent communications based on the receive power level (at the UE) for the SSB transmissions.

A method for wireless communication at a UE is described. The method may include receiving an indication of a transmission power for a SSB transmission by a base station, the indicated transmission power different than a default transmission power for SSB transmissions by the base station, determining a received power with which the SSB transmission is received at the UE, and receiving one or more downlink transmissions from the base station based on the received power for the SSB transmission and a difference between the default transmission power and the indicated transmission power for the SSB transmission.

An apparatus for wireless communication at a UE is described. The apparatus may include a processor, a transceiver coupled with the processor; and memory coupled with the processor. The memory and the processor may be configured to cause the apparatus to receive an indication of a transmission power for a SSB transmission by a base station, the indicated transmission power different than a default transmission power for SSB transmissions by the base station, determine a received power with which the SSB transmission is received at the UE, and receive one or more downlink transmissions from the base station based on the received power for the SSB transmission and a difference between the default transmission power and the indicated transmission power for the SSB transmission.

Another apparatus for wireless communication at a UE is described. The apparatus may include means for receiving an indication of a transmission power for a SSB transmission by a base station, the indicated transmission power different than a default transmission power for SSB transmissions by the base station, means for determining a received power with which the SSB transmission is received at the UE, and means for receiving one or more downlink transmissions from the base station based on the received power for the SSB transmission and a difference between the default transmission power and the indicated transmission power for the SSB transmission.

A non-transitory computer-readable medium storing code for wireless communication at a UE is described. The code may include instructions executable by a processor to receive an indication of a transmission power for a SSB transmission by a base station, the indicated transmission power different than a default transmission power for SSB transmissions by the base station, determine a received power with which the SSB transmission is received at the UE, and receive one or more downlink transmissions from the base station based on the received power for the SSB transmission and a difference between the default transmission power and the indicated transmission power for the SSB transmission.

Some examples of the method, apparatuses, and non-transitory computer-readable medium described herein may further include operations, features, means, or instructions for receiving, from the base station, signaling that indicates a set of multiple power modes for the base station, where the indication of the transmission power identifies a power mode of the set of multiple power modes.

In some examples of the method, apparatuses, and non-transitory computer-readable medium described herein, the power mode corresponds to the difference between the default transmission power and the indicated transmission power, a configuration of antenna panels or subpanels, a quantity of transmission beams, a pattern of transmission beams, or any combination thereof, for a set of SSB transmissions by the base station that includes the SSB transmission.

In some examples of the method, apparatuses, and non-transitory computer-readable medium described herein, the indication of the transmission power or additional signaling received by the UE includes an indication of a quantity of antenna panels or subpanels used by the base station for the SSB transmission.

In some examples of the method, apparatuses, and non-transitory computer-readable medium described herein, the indication of the quantity of antenna panels or subpanels or second additional signaling received by the UE indicates a respective identifier associated with each antenna panel or subpanel included in the quantity of antenna panels or subpanels.

In some examples of the method, apparatuses, and non-transitory computer-readable medium described herein, receiving the indication of the transmission power may include operations, features, means, or instructions for receiving an indication of a power offset for the SSB transmission from the base station, the power offset corresponding to the difference between the indicated transmission power and the default transmission power.

Some examples of the method, apparatuses, and non-transitory computer-readable medium described herein may further include operations, features, means, or instructions for receiving, from the base station, an indication of a time for a change from the indicated transmission power to a second transmission power for subsequent SSB transmissions by the base station.

In some examples of the method, apparatuses, and non-transitory computer-readable medium described herein, the indication of the time for the change indicates at least one of a start time for the second transmission power, a duration of time until the change, a quantity of symbols until the change, a quantity of slots until the change, a quantity of frames until the change, or any combination thereof.

Some examples of the method, apparatuses, and non-transitory computer-readable medium described herein may further include operations, features, means, or instructions for receiving, from the base station, signaling that indicates a second transmission power for SSB transmissions by a candidate cell available for handover of the UE and receiving a SSB transmission from the candidate cell according to the second transmission power.

In some examples of the method, apparatuses, and non-transitory computer-readable medium described herein, the signaling that indicates the second transmission power includes radio resource control (RRC) signaling, medium access control-control element (MAC-CE) signaling, downlink control information (DCI) signaling, or any combination thereof.

In some examples of the method, apparatuses, and non-transitory computer-readable medium described herein, the signaling that indicates the second transmission power may be received based on a periodic schedule, based on a change to the second transmission power by the candidate cell, based on a system information request transmitted by the UE, or any combination thereof.

Some examples of the method, apparatuses, and non-transitory computer-readable medium described herein may further include operations, features, means, or instructions for transmitting, to the base station, channel information based on the received power at the UE for the SSB transmission, where receiving the one or more downlink transmissions based on the received power and the difference between the default transmission power and the indicated transmission power for the SSB transmission includes receiving a downlink transmission based on one or more transmission or reception parameters that may be based on the channel information and the difference between the default transmission power and the indicated transmission power for the SSB transmission.

Some examples of the method, apparatuses, and non-transitory computer-readable medium described herein may further include operations, features, means, or instructions for receiving an indication of a power offset for a downlink transmission of the one or more downlink transmissions, the power offset relative to the default transmission power for the SSB transmission, where receiving the one or more downlink transmissions based on the received power and the difference between the default transmission power and the indicated transmission power for the SSB transmission includes receiving the downlink transmission based on the indicated power offset for the downlink transmission, the received power for the SSB, and the difference between the default transmission power and the indicated transmission power for the SSB.

In some examples of the method, apparatuses, and non-transitory computer-readable medium described herein, receiving the indication of the transmission power may include operations, features, means, or instructions for receiving MIB signaling, SIB signaling, RRC signaling, DCI signaling, or any combination thereof that includes the indication of the transmission power.

In some examples of the method, apparatuses, and non-transitory computer-readable medium described herein, the indicated transmission power corresponds to an energy-per resource element (EPRE) for the SSB transmission.

A method for wireless communication at a base station is described. The method may include transmitting, to a UE, an indication of a transmission power for a SSB transmission by the base station, the indicated transmission power different than a default transmission power for SSB transmissions by the base station, transmitting the SSB transmission at a transmit power level corresponding to the indicated transmission power, and transmitting one or more downlink transmissions to the UE based on a received power at the UE for the SSB transmission and a difference between the default transmission power and the indicated transmission power for the SSB transmission.

An apparatus for wireless communication at a base station is described. The apparatus may include a processor, a transceiver coupled with the processor; and memory coupled with the processor. The memory and the processor may be configured to cause the apparatus to transmit, to a UE, an indication of a transmission power for a SSB transmission by the base station, the indicated transmission power different than a default transmission power for SSB transmissions by the base station, transmit the SSB transmission at a transmit power level corresponding to the indicated transmission power, and transmit one or more downlink transmissions to the UE based on a received power at the UE for the SSB transmission and a difference between the default transmission power and the indicated transmission power for the SSB transmission.

Another apparatus for wireless communication at a base station is described. The apparatus may include means for transmitting, to a UE, an indication of a transmission power for a SSB transmission by the base station, the indicated transmission power different than a default transmission power for SSB transmissions by the base station, means for transmitting the SSB transmission at a transmit power level corresponding to the indicated transmission power, and means for transmitting one or more downlink transmissions to the UE based on a received power at the UE for the SSB transmission and a difference between the default transmission power and the indicated transmission power for the SSB transmission.

A non-transitory computer-readable medium storing code for wireless communication at a base station is described. The code may include instructions executable by a processor to transmit, to a UE, an indication of a transmission power for a SSB transmission by the base station, the indicated transmission power different than a default transmission power for SSB transmissions by the base station, transmit the SSB transmission at a transmit power level corresponding to the indicated transmission power, and transmit one or more downlink transmissions to the UE based on a received power at the UE for the SSB transmission and a difference between the default transmission power and the indicated transmission power for the SSB transmission.

Some examples of the method, apparatuses, and non-transitory computer-readable medium described herein may further include operations, features, means, or instructions for transmitting, to the UE, signaling that indicates a set of multiple power modes for the base station, where the indication of the transmission power identifies a power mode of the set of multiple power modes.

In some examples of the method, apparatuses, and non-transitory computer-readable medium described herein, the power mode corresponds to the difference between the default transmission power and the indicated transmission power, a configuration of antenna panels or subpanels, a quantity of transmission beams, a pattern of transmission beams, or any combination thereof, for a set of SSB transmissions by the base station that includes the SSB transmission.

In some examples of the method, apparatuses, and non-transitory computer-readable medium described herein, the indication of the transmission power or additional signaling transmitted to the UE includes an indication of a quantity of antenna panels or subpanels used by the base station for the SSB transmission.

In some examples of the method, apparatuses, and non-transitory computer-readable medium described herein, the indication of the quantity of antenna panels or subpanels or second additional signaling transmitted to the UE indicates a respective identifier associated with each antenna panel or subpanel included in the quantity of antenna panels or subpanels.

In some examples of the method, apparatuses, and non-transitory computer-readable medium described herein, transmitting the indication of the transmission power may include operations, features, means, or instructions for transmitting, to the UE, an indication of a power offset for the SSB transmission from the base station, the power offset corresponding to the difference between the indicated transmission power and the default transmission power.

Some examples of the method, apparatuses, and non-transitory computer-readable medium described herein may further include operations, features, means, or instructions for transmitting, to the UE, an indication of a time for a change from the indicated transmission power to a second transmission power for subsequent SSB transmissions by the base station.

In some examples of the method, apparatuses, and non-transitory computer-readable medium described herein, the indication of the time for the change indicates at least one of a start time for the second transmission power, a duration of time until the change, a quantity of symbols until the change, a quantity of slots until the change, a quantity of frames until the change, or any combination thereof.

Some examples of the method, apparatuses, and non-transitory computer-readable medium described herein may further include operations, features, means, or instructions for transmitting, to the UE, signaling that indicates a second transmission power for SSB transmissions by a candidate cell available for handover of the UE.

In some examples of the method, apparatuses, and non-transitory computer-readable medium described herein, the signaling that indicates the second transmission power includes RRC signaling, MAC-CE signaling, DCI signaling, or any combination thereof.

In some examples of the method, apparatuses, and non-transitory computer-readable medium described herein, the signaling that indicates the second transmission power may be transmitted based on a periodic schedule, based on a change to the second transmission power by the candidate cell, based on a system information request transmitted by the UE, or any combination thereof.

In some examples of the method, apparatuses, and non-transitory computer-readable medium described herein, transmitting the one or more downlink transmissions based on the received power and the difference between the default transmission power and the indicated transmission power for the SSB transmission may include operations, features, means, or instructions for receiving, from the UE, channel information based on the received power at the UE for the SSB transmission and configuring one or more parameters for transmitting the one or more downlink transmissions based on the channel information and the difference between the default transmission power and the indicated transmission power for the SSB transmission.

In some examples of the method, apparatuses, and non-transitory computer-readable medium described herein, transmitting the indication of the transmission power may include operations, features, means, or instructions for transmitting MIB signaling, SIB signaling, RRC signaling, DCI signaling, or any combination thereof that includes the indication of the transmission power.

In some examples of the method, apparatuses, and non-transitory computer-readable medium described herein, the transmission power corresponds to a respective EPRE value for the SSB transmission from the base station.

DETAILED DESCRIPTION

Figure 1:
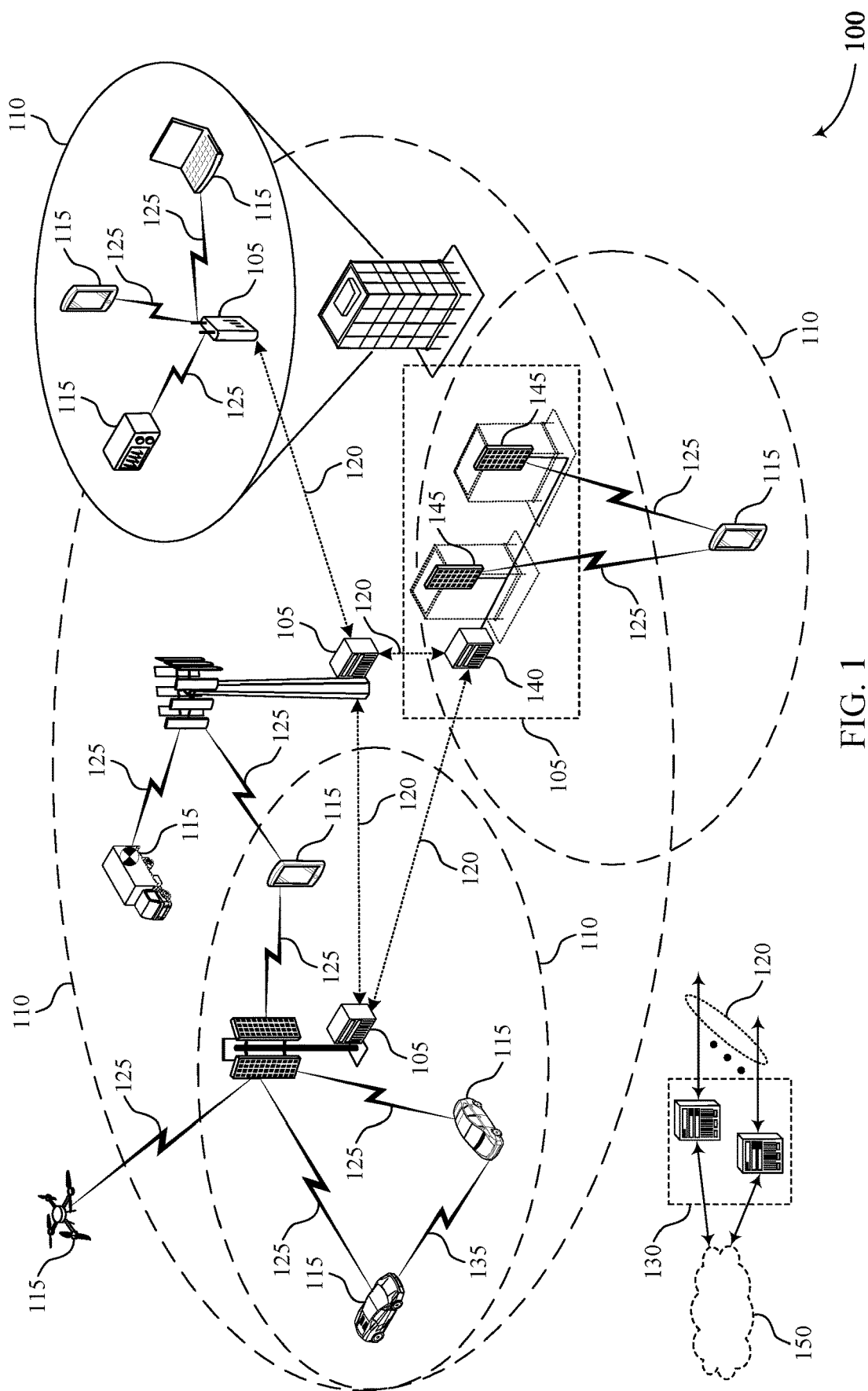
FIG. 1 illustrates an example of a wireless communications system that supports power adaptation for synchronization signal blocks (SSBs) in accordance with aspects of the present disclosure.

Wireless networks may adopt various mechanisms to improve wireless communications while conserving resources, such as power saving operations. One example of such power saving operations may be for a base station configured with multiple antenna panels/subpanels to only use a subset of the antenna panel(s)/subpanel(s) for at least some synchronization signal block (SSB) transmissions. However, using the subset of antenna panel(s)/subpanel(s) may reduce the transmission power for a corresponding SSB transmission (e.g., such as when the base station uses all configured antenna panel/subpanels for the SSB transmission). As user equipment (UE) may generally utilize the SSB transmissions for various power control functions, channel performance detection, and the like, and thus reducing the transmission power of the SSB transmissions (such as by using only the subset of available antenna panels/subpanels) may distort or negatively impact the UE power measurements.

Generally, aspects of the techniques described herein provide various mechanisms for the network to conserve power for some broadcast transmissions, such as SSB transmissions by a base station, while enabling UE to continue utilizing the SSB transmissions for channel performance measurement and adaptation (e.g., in support of subsequent communications with the base station). For example, the base station may include or otherwise convey an indication of the transmission power for the SSB transmissions.

For example, the base station may include a power offset indication, an indication regarding the number of antenna(s)/antenna subpanel(s) being used for the SSB transmission, or the like. In some examples, the base station may configure the UE with a set of power modes, where each power mode corresponds to a particular transmission power for the SSB transmissions, such as an absolute transmission power being used, a power offset for the SSB transmissions (e.g., with respect to a default transmission power), the antenna(s)/antenna subpanel(s), etc., being used for the SSB transmissions. In examples where the set of power modes are configured for the UE, the base station may indicate or otherwise convey an indication of the power mode being used for the SSB transmissions. Additionally, or alternatively, a base station may indicate a quantity of antenna panels/subpanels used for an SSB transmission, a power offset for an SSB transmission (e.g., through a direct indication, as opposed to an indication of a corresponding power mode), or the like.

Accordingly, the UE may receive the SSB transmissions from the base station according to the transmission power. The UE may perform subsequent downlink and/or uplink transmissions with the base station based on the SSB transmissions. For example, the UE and/or base station may select or otherwise configure parameter(s) for the subsequent communications based on the receive power level (at the UE) for the SSB transmissions.

Aspects of the disclosure are initially described in the context of wireless communications systems. Aspects of the disclosure are further illustrated by and described with reference to apparatus diagrams, system diagrams, and flowcharts that relate to power adaptation for SSBs.

FIG. 1 illustrates an example of a wireless communications system 100 that supports power adaptation for SSBs in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may receive an indication of a transmission power for a SSB transmission by a base station 105, the indicated transmission power different than a default transmission power for SSB transmissions by the base station 105. The UE 115 may determine a received power with which the SSB transmission is received at the UE 115. The UE 115 may receive one or more downlink transmissions from the base station 105 based at least in part on the received power for the SSB transmission and a difference between the default transmission power and the indicated transmission power for the SSB transmission.

A base station 105 may transmit, to a UE 115, an indication of a transmission power for a SSB transmission by the base station 105, the indicated transmission power different than a default transmission power for SSB transmissions by the base station. The base station 105 may transmit the SSB transmission at a transmit power level corresponding to the indicated transmission power. The base station 105 may transmit one or more downlink transmissions to the UE 115 based at least in part on a received power at the UE 115 for the SSB transmission and a difference between the default transmission power and the indicated transmission power for the SSB transmission.

Figure 2:
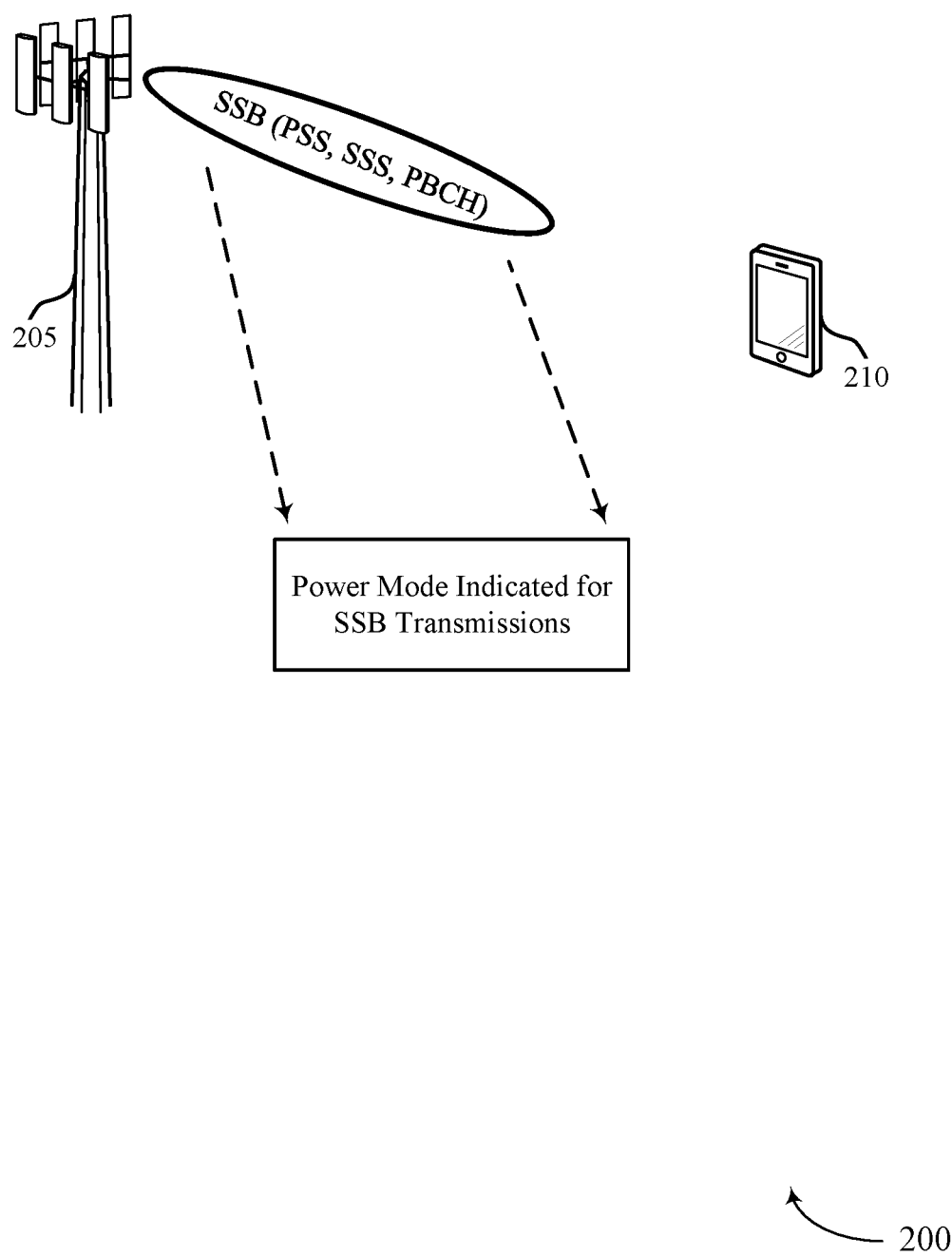
FIG. 2 illustrates an example of a wireless communication system that supports power adaptation for SSBs in accordance with aspects of the present disclosure.

FIG. 2 illustrates an example of a wireless communication system 200 that supports power adaptation for SSBs in accordance with aspects of the present disclosure. Wireless communication system 200 may implement aspects of wireless communication system 100. Wireless communication system 200 may include a base station 205 and/or UE 210, which may be examples of the corresponding devices described herein.

Wireless communication systems generally adopt various modes and operations to save power and maintain network operations. One example of such network power saving operations may include base station 205 using subpanels, rather than using the entire antenna panel, for transmissions. That is, base station 205 may include an antenna panel that may be divided into two or more antenna subpanels. Each subpanel may include one or more antennas (e.g., antenna configurations, antenna ports, etc.). Generally, base station 205 may use the various antennas (e.g., per antenna panel and/or antenna subpanel) for wireless transmissions to UE(s), such as UE 210, and/or other network nodes (e.g., unicast transmissions, multicast transmissions, and/or broadcast transmissions). For example, base station 205 may use the various antennas for directional transmissions (e.g., beamforming using various hardware and/or software-based weighting factors designed to steer the wireless transmission toward an intended recipient). In some examples, this may include base station 205 (e.g., a gNB, TRP, etc.) with multiple antenna panels/subpanels/antennas, may turn some antenna panels/subpanels/antennas on or off for a given wireless transmission. Generally, such wireless transmissions may be coordinated with the intended recipient (e.g., using a grant and/or other configuration signaling).

While this technique may be beneficial for network power saving operations, this may introduce other issues for certain types of wireless transmissions. One example of such a wireless transmission includes SSB transmissions from base station 205. Generally, base station 205 may perform SSB transmissions by transmitting a primary synchronization signal (PSS), a secondary synchronization signal (SSS), and physical broadcast channel (PBCH) transmission within a block of consecutive symbols, which collectively form the SS/PBCH block (e.g., the SSB). Conventionally, UEs receiving the SSB assume that SSS, PBCH demodulation reference signal (DMRS), and PBCH data have the same energy per resource element (EPRE), with the ratio of PSS EPRE and SSS EPRE within a SSB in a corresponding cell is either 0 db or 3 db. Such assumptions are critical for the UE to perform channel estimation of the SSBs and for cell searching (e.g., to support UE mobility).

More particularly, EPRE is generally assumed to be constant across a given bandwidth (e.g., bandwidth part (BWP)) and in the SSS carried in SS/PBCH blocks. The ratio of SSS EPRE to PBCH DMRS EPRE may be 0 db, in some examples. The SSS EPRE may generally be derived from the ss-PBCH-BlockPower information element (IE), which may be an integer (−60 . . . 50). The default transmission power of the SSB may also impact other wireless communication functions. For example and for channel state information reference signal (CSI-RS), which is also used by UEs for channel estimation and reporting, the EPRE is assumed to be constant across the configured bandwidth and OFDM symbols. The CSI-RS EPRE is derived via an offset that is relative to the SSS EPRE. For example, the power offset for the non-zero power (NZP) CSI-RS resource element (RE) relative to the SSS RE may be indicated using the powerControlOffsetSS, which may be enumerated as (db-3, db0, db3, db6). For downlink data transmissions (e.g., physical downlink shared channel (PDSCH)), the power offset of PDSCH RE relative to the NZP-CSI-RS RE may be indicated by the powerControlOffset IE, which may be an integer ranging from −8 db to 15 db in 1 db increments. In a final example, the ration of PDSCH EPRE to DMRS EPRE (e.g., $\beta_{DMRS}$) may be indicated using a table based on the number of DMRS CDM groups without data and the DMRS configuration type (e.g., −4.77 db to 0 dB).

Accordingly, network power saving operations where base station 205 performs SSB transmissions with fewer antennas/antenna panels/antenna subpanels may negatively impact the performance of such SSB transmissions, such as when base station 205 uses a wider beam and/or varies from the default SSB transmission power (e.g., the assumed EPRE relationship). That is, SSB transmissions using fewer than the default number of antennas/antenna panels/antenna subpanels and/or using a less-than default transmission power for the SSB transmissions may negatively impact channel estimation at the UE, which may generally disrupt wireless communications between base station 205 and UE 210. As discussed, UE 210 may conventionally use the SSB power measurement (e.g., measure the receive power level of a received SSB transmission transmitted at an assumed default transmission power) to calibrate other downlink channels/signals for the channel between base station 205 and UE 210.

Although the techniques described herein are generally discussed with respect to base station 205 using fewer antennas/antenna panels/antenna subpanels for the SSB transmissions, it is to be understood that these techniques may also be adopted when base station 205 is simply operating in a reduced power mode with respect to SSB transmissions (e.g., base station 205 adopts a power mode having a SSB transmission power level that is less than the default, or assumed, SSB transmission power level).

Accordingly, aspects of the techniques discussed herein provide various mechanisms that support network power saving operations while maintaining proper channel estimation procedures by UE 210 based on SSB transmissions. That is, the techniques described herein provide various mechanisms for the network (e.g., at and/or via base station 205) to inform UE 210 (and any other UE interested in receiving SSB transmissions from base station 205) of the transmission power for its SSB transmissions. This may make UE 210 aware of the relative power (e.g., the actual transmission power relative to the default transmission power) when adaptations of the SSB transmission power occur (e.g., when the power saving operations are implemented by the network).

In some examples, this may include base station 205 transmitting or otherwise providing (and UE 210 receiving or otherwise obtaining) an indication of the transmission power for SSB transmissions by base station 205. The transmission power for the SSB transmissions may be different than (e.g., lower or otherwise reduced) than the default transmission power (e.g., the assumed transmission power) for SSB transmissions by base station 205.

For example, base station 205 may use RRC signaling (or other higher signaling, such as remaining system information (RMSI), master information block (MIB), secondary information block (SIB), group common DCI signaling, etc.) to indicate one of multiple energy modes (e.g., power modes) of base station 205 (e.g., indicate the energy/power mode used for the SSB transmissions, which in turn indicates the actual transmission power). Broadly, each energy/power mode of base station 205 may include or otherwise be associated with a power offset (e.g., in db) relative to the default transmission power (e.g., the assumed transmission power) for the SSB transmissions. That is, the power mode may correspond to the difference between the default or assumed transmission power and the actual/indicated transmission power. The indication may also carry or otherwise convey an indication of the SSB pattern, the number of SSBs, etc., associated with the indicated power mode. The energy/power modes of base station 205 may include the default energy/power mode (e.g., SSB transmissions using the default or assumed transmission power). In some examples, when no energy/power mode is indicated by base station 205, the default energy/power mode may be assumed by UEs, such as UE 210.

In some cases, base station 205 may transmit an indication of SSB transmission power (e.g., an indication of an associated power mode) that corresponds to one set of one or more SSBs, and base station 205 may transmit other indications of SSB transmission power that respectively correspond to other sets of one or more SSBs. For example, base station 205 may transmit some SSBs in accordance with one power mode (e.g., a reduced power mode) and other SSBs in accordance with another power mode (e.g., a default power mode or another reduced power mode), and base station 205 may transmit a corresponding indication of the power mode for each set of one or more SSBs transmitted by base station 205.

In some examples, the power mode(s) of base station 205 may correspond to the configuration of antenna panels/subpanels used for the SSB transmission. That is, each power mode may be associated with a specific number/configuration of antenna(s), antenna panel(s), antenna subpanel(s), etc., being used for the SSB transmissions by base station 205. In some examples, the power mode(s) of base station 205 may correspond to the quantity (e.g., how many, how many of a particular type/configuration, etc.) of transmit beams and/or the pattern of the transmit beams (e.g., direction(s), beam width(s), periodicity, etc.) being used for the SSB transmissions from base station 205.

One non-limiting example of the energy/power mode(s) supported by base station 205 is illustrated in Table 1 below:

| Energy/Power Mode | Power Offset | # of SSB(s) | SSB Pattern |
|---|---|---|---|
| $E_0$ (Default) | 0 dB | 8 | Bitmap0 |
| $E_1$ | −3 dB | 8 | Bitmap1 |
| ... | ... | ... | ... |
| $E_N$ | −6 dB | 4 | BitmapN |

In some examples, the indication of the transmission power (and/or other additional signaling) may include base station 205 providing an indication of the number of antenna panels or subpanels (e.g., how many/which antenna(s), antenna panel(s), and/or antenna subpanel(s)) being used by base station 205 for the SSB transmissions. For example, the indication may carry or otherwise convey an identifier associated with each antenna, antenna panel, and/or antenna subpanel being used for the SSB transmissions. In some examples, this may include the MIB included in the SSB transmissions and/or SIB being used to indicate the number of antenna panels or subpanels being used for the transmission of the SSBs. The number of antennas within each antenna subpanel may be fixed (e.g., constant) or signaled along with the number of antenna subpanels. Indicating the identifier of each antenna subpanel being used for the SSB transmissions may be leveraged, in some examples, to identify or otherwise determine the difference between the antenna panels and/or subpanels (e.g., each antenna panel/subpanel may be associated with different capabilities/configurations, such that the identifier may be used to determine the capabilities/configuration being used for the SSB transmissions).

In some examples, the indication of the transmission power being used for the SSB transmissions may include an indication of a power offset being used for the SSB transmissions. That is, base station 205 may provide an indication of the difference between the default transmission power typically used for SSB transmissions and the transmission power actually being used for the SSB transmissions. In some examples, this may include adding the indication of the power offset to the MIB/SIB to indicate the power offset in SSB transmissions (e.g., based on base station 205 using only certain antenna panels/subpanels for the SSB transmissions). Accordingly, the power offset indication may be an indication of the difference in transmission power in dB(s), such as using in one dB increments.

In some examples, the indication of the transmission power being used for the SSB transmissions may include the absolute transmission power being used for the SSB transmissions. For example, the indication may identify the actual transmit power base station 205 is using for the SSB transmissions.

In some examples, base station 205 may signal various timing features related to the SSB transmissions. That is, it may be helpful for UE 210 to know if/when (e.g., in the future) the network (e.g., via base station 205) will change the number of antenna panels/subpanels to be used for the SSB transmissions. Without such knowledge, this may result in UE 210 attempting to blind decode using multiple hypothesis. Accordingly, in some examples base station 205 may signal upcoming changes in the antenna panels/subpanels to be used for the future SSB transmissions. The change time may be provided along with the indication of the transmission power and/or using separate signaling. In some examples, base station 205 may configure the MIB, SIB, etc., to contain information about the following change and when the change occurs.

For example, base station 205 may provide an indication of the time for the change in SSB transmission powers. For example, base station 205 may transmit or otherwise provide an indication of the time for a change from the default transmission power to the indicated transmission power, from the indicated transmission power to a second transmission power (e.g., an updated transmission power), and the like. The time change may be signaled in terms of symbols, slots, sub-frames, frames, etc. In some examples, the time change may be signaled in terms of absolute time (e.g., milliseconds or seconds) and/or relative time (e.g., time with respect to other signals, such as relative to the indication of the transmission power). In the situation where the time change is greater than a threshold, the base station 205 may indicate infinity as the time change.

Accordingly, UE 210 may receive the SSB transmissions and measure or otherwise determine the received power for the SSB transmissions. UE 210 may receive or otherwise obtain (and base station 205 may transmit or otherwise provide) subsequent downlink transmission(s) based on the received power and the difference between the indicated transmission power and the default transmission power. For example, UE 210 may identify the transmission power being used for the SSB transmissions (e.g., based on the indication) and then use this information to measure or otherwise determine the receive power level that UE 210 received the SSB transmissions. UE 210 may use the receive power level and the indicated transmission power for the SSB transmissions to identify or otherwise determine channel performance metrics (e.g., CSI) for the channel between base station 205 and UE 210. The channel performance metrics may be used for the subsequent downlink transmissions.

For example, UE 210 may transmit or otherwise provide (and base station 205 may receive or otherwise obtain) the channel information (e.g., the channel performance metrics, such as CSI) based on the received power for the SSB transmissions. Base station 205 may use the channel information to schedule/configure downlink transmissions to UE 210 and/or uplink transmissions from UE 210 (e.g., based on the channel performance metrics). That is, UE 210 may receive the downlink transmissions and/or uplink transmissions based on transmission parameters and/or reception parameters, respectively, that are identified or otherwise determined based on the channel information and the transmission power difference.

In some examples, base station 205 may signal a power offset for the downlink transmission(s) relative to the default transmission power for the SSB transmissions (e.g., the PDSCH EPRE to DMRS EPRE). Accordingly, UE 210 may receive the subsequent downlink transmission(s) according to the power offset indicated for the downlink transmissions (e.g., may receive and attempt to decode the downlink transmissions based on the indicated power offset relative to the SSB transmissions).

Accordingly, aspects of the techniques described herein may be used to signal transmission power information for SSB transmissions when those SSB transmissions use a reduced transmission power (e.g., based on the power/energy mode being used by the base station and/or the number of antenna panels/subpanels being used for the SSB transmissions). This may provide a mechanism where UE 210 and base station 205 maintain channel performance synchronization for subsequent communications.

Figure 3:
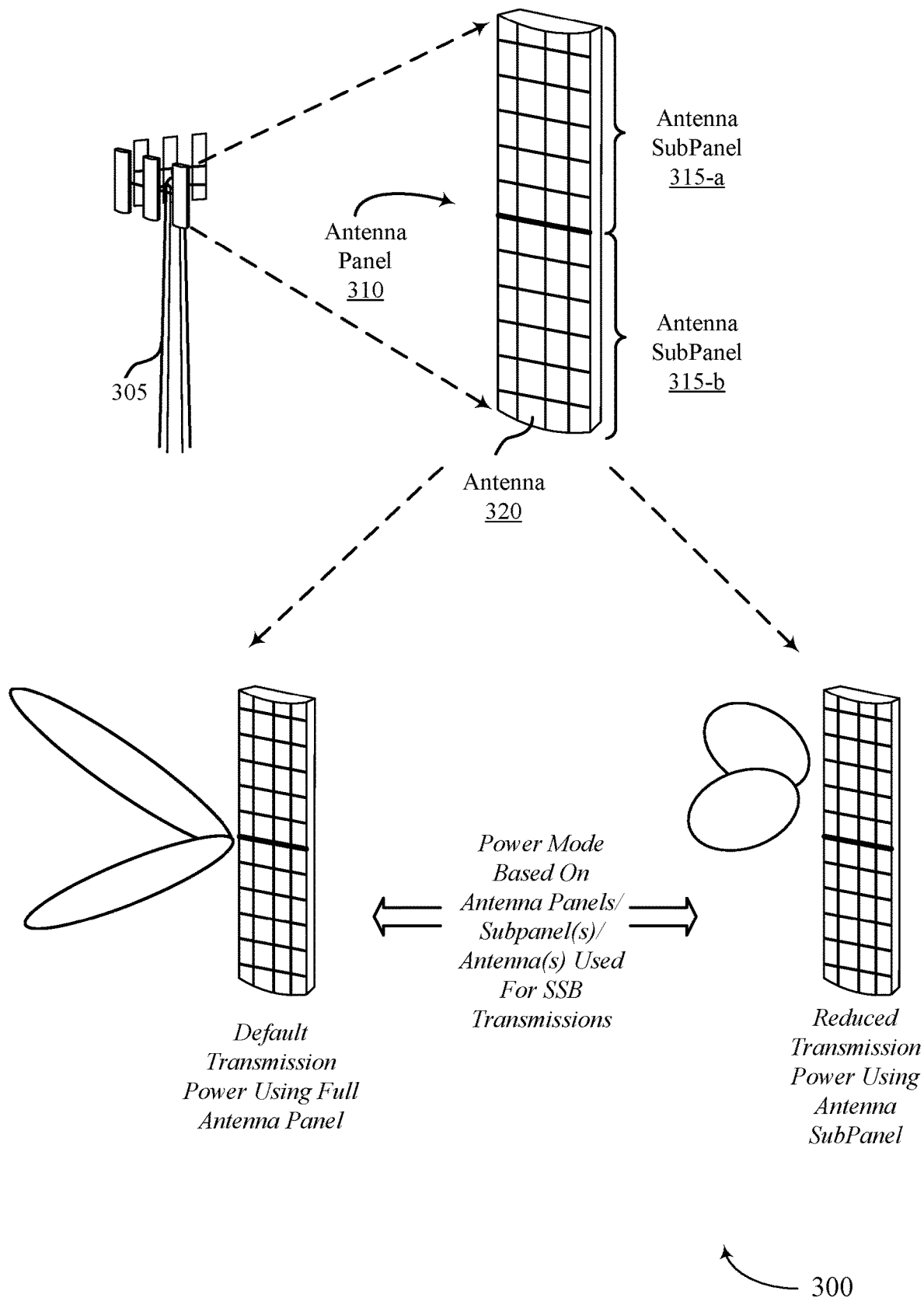
FIG. 3 illustrates an example of a wireless communication system that supports power adaptation for SSBs in accordance with aspects of the present disclosure.

FIG. 3 illustrates an example of a wireless communication system 300 that supports power adaptation for SSBs in accordance with aspects of the present disclosure. Wireless communication system 300 may implement aspects of wireless communication systems 100 and/or 200. Wireless communication system 300 may include base station 305, which may be an example of the corresponding device described herein. Broadly, base station 305 illustrates a non-limiting example of a base station performing SSB transmissions at reduced transmission powers.

As discussed herein, aspects of the techniques described herein provide various mechanisms where a base station indicates to UE(s) the transmission power being used for SSB transmissions from the base station. For example, base station 305 may transmit or otherwise provide the indication of the transmission power for SSB transmissions. The transmission power may be a reduced transmission power (e.g., different) relative to a default or assumed transmission power for the SSB transmissions. The indicated transmission power may include an indication of the actual transmission power (e.g., in 1 dB increments), a power/energy mode the base station is operating in (e.g., an indication of a power/energy mode from a set of (pre)configured power/energy modes), an indication (e.g., identifier) of the antenna panel(s)/subpanel(s) being used for the SSB transmissions, or any combination thereof. The indication may be conveyed in RMSI, SIB, MIB, DCI (e.g., a group common DCI), and/or RRC signaling.

The base station may transmit the SSBs according to the indicated transmission power and the UE(s) may measure or otherwise determine the receive power for the SSB transmissions based on the indicated transmission power relative to the default or assumed transmission power. The UE may use the receive power in relation to the difference between the indicated transmission power and the default transmission power to determine channel properties (e.g., CSI) for the channel between the UE and base station. The UE may transmit an indication of the channel properties (e.g., in a CSI report) to the base station, which may use the channel properties when scheduling/configuring subsequent uplink and/or downlink communications with the UE. Base station 305 illustrates one non-limiting example of how SSB transmission powers may be adjusted.

Base station 305 may include one or more antenna panels 310. Each antenna panel 310 may include two or more antenna subpanels 315. Each antenna subpanel 315 may include one or more antennas 320. Base station 305 may control or otherwise manage aspects of SSB transmission power based on activating/turning on or deactivating/turning off one or more antenna panels 310, antenna subpanels 315, and/or antennas 320. For example, an SSB transmission using one antenna panel 310 may have a lower transmission power than an SSB transmission using multiple antenna panels 310. Similarly, an SSB transmission using one antenna subpanels 315 may have a lower transmission power than an SSB transmission using multiple antenna subpanels 315. An SSB transmission using one antenna 320 may have a lower transmission power than an SSB transmission using multiple antennas 320.

In some examples, one or more antenna panels 310, antenna subpanels 315, and/or antennas may be used for beamformed communications. For example, base station 305 may active, apply a weighting factor, apply a steering configuration, etc., to an activated set of antenna panels 310, antenna subpanels 315, and/or antennas 320 to steer the beam used for SSB transmissions in a specific direction, to have a specific width, etc. Accordingly, different beamforming configurations may be associated with different SSB transmission power levels, where each beamforming configuration may be associated with a specific set of antenna panels 310, antenna subpanels 315, and/or antennas 320.

As discussed above, in some examples base station 305 may indicate the identifier associated with the active antenna panels) 310, antenna subpanel(s) 315, and/or antenna(s) 320 to the UE. The identifier may carry an indication of the particular capabilities/properties of the active antenna panels) 310, antenna subpanel(s) 315, and/or antenna(s) 320. The UE may use the identifier, and associated capabilities/properties, to determine the SSB transmission power being used by base station 305.

Figure 4:
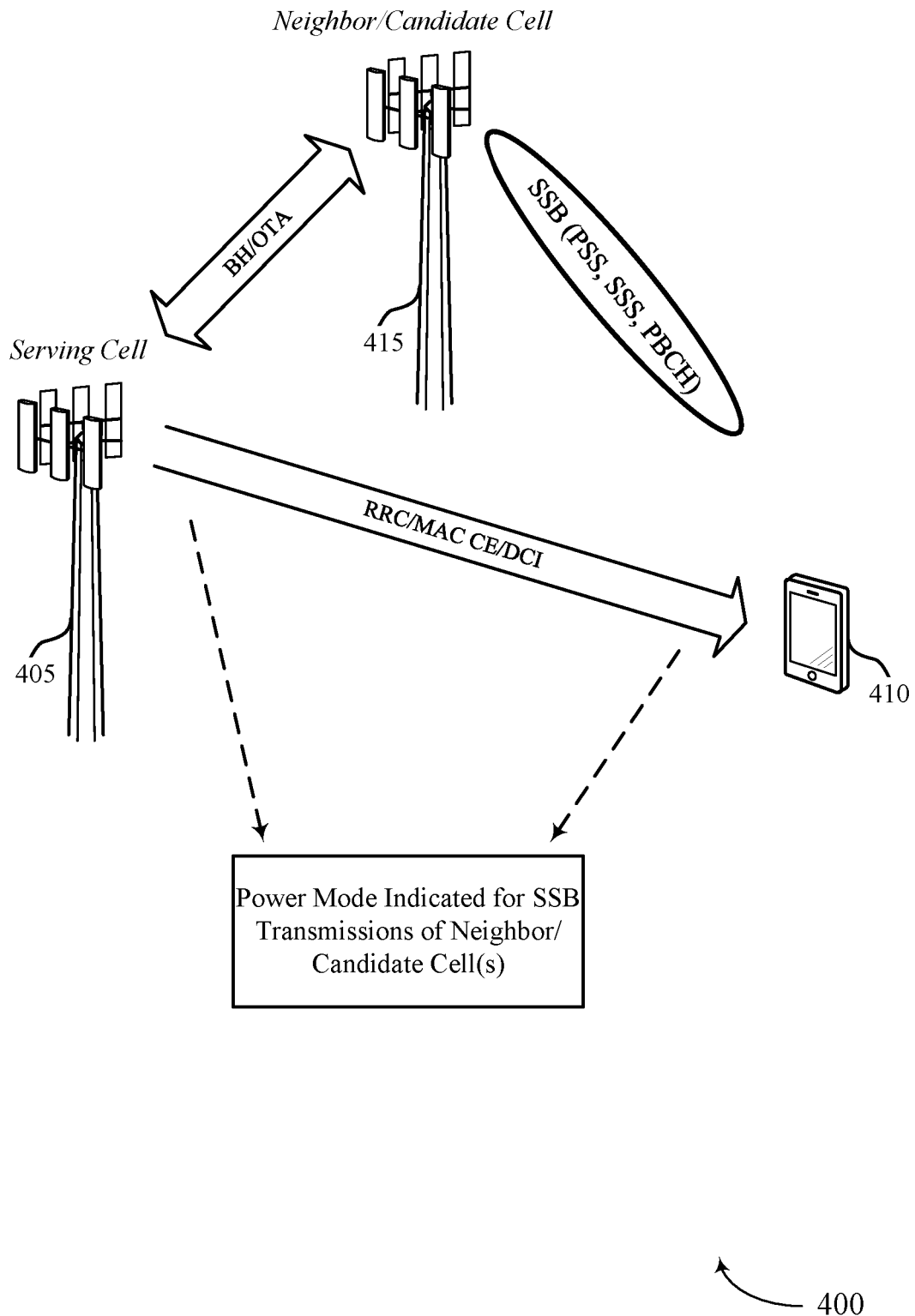
FIG. 4 illustrates an example of a wireless communication system that supports power adaptation for SSBs in accordance with aspects of the present disclosure.

FIG. 4 illustrates an example of a wireless communication system 400 that supports power adaptation for SSBs in accordance with aspects of the present disclosure. Wireless communication system 400 may implement aspects of wireless communication systems 100, 200 and/or 300. Wireless communication system 400 may include base station 405, UE 410, and/or base station 415, which may be examples of the corresponding devices described herein.

As discussed herein, aspects of the techniques described herein provide various mechanisms where a base station indicates to UE(s) (such as UE 410) the transmission power being used for SSB transmissions from the base station. For example, base station 405 may transmit or otherwise provide the indication of the transmission power for SSB transmissions. The transmission power may be a reduced transmission power (e.g., different) relative to a default or assumed transmission power for the SSB transmissions. The indicated transmission power may include an indication of the actual transmission power (e.g., in 1 dB increments), a power/energy mode the base station is operating in (e.g., an indication of a power/energy mode from a set of (pre) configured power/energy modes), an indication (e.g., identifier) of the antenna panel(s)/subpanel(s) being used for the SSB transmissions, or any combination thereof. The indication may be conveyed in RMSI, SIB, MIB, DCI (e.g., a group common DCI), and/or RRC signaling.

The base station may transmit the SSBs according to the indicated transmission power and the UE(s) may measure or otherwise determine the receive power for the SSB transmissions based on the indicated transmission power relative to the default or assumed transmission power. The UE may use the receive power in relation to the difference between the indicated transmission power and the default transmission power to determine channel properties (e.g., CSI) for the channel between the UE and base station. The UE may transmit an indication of the channel properties (e.g., in a CSI report) to the base station, which may use the channel properties when scheduling/configuring subsequent uplink and/or downlink communications with the UE.

Wireless communication system 400 illustrates an example where base station 405 (e.g., the serving cell of UE 410) indicates or otherwise provides SSB transmission power of neighboring or candidate cells (e.g., base stations that UE 410 might be able to perform a handover too). That is, wireless communication system 400 includes base station 405 signaling the active antenna panels, antenna subpanels, and/or antennas of base station 415 (e.g., the neighboring/candidate cell in this example) to UE 410. This may include base station 405 indicating the SSB transmission power of base station 415 to UE 410. For example, base station 405 may transmit or otherwise provide (and UE 410 may receive or otherwise obtain) signaling that indicates a second transmission power for SSB transmissions by a candidate cell available for handover of UE 410. In this example, this may include base station 405 identifying or otherwise determining the transmission power that base station 415 is using for SSB transmissions. This may include various backhaul (BH) and/or over-the-air (OTA) signaling between base station 405 and base station 415 and/or between base station 405 and one or more functions of the core network (e.g., a MME function). Base station 405 may use various signaling to carry or otherwise convey the indication of the base station 415 SSB transmission power to UE 410 (e.g., RRC signaling, MAC CE, DCI (e.g., a group common DCI), and the like).

In some examples, UE 410 may request information from base station 405 regarding the SSB transmission power of base station 415 (e.g., in a system information request), and the indication of the SSB transmission power of base station 415 may be received in response. In other examples, UE 410 may receive the indication of the SSB transmission powers of base station 415 according to a periodic schedule. In other examples, UE 410 may receive the indication of the SSB transmission powers of base station 415 in response to a change to the SSB transmission power being used by base station 415 (e.g., which may include a change time associated with the change, in some examples).

UE 410 may receive the indication of the SSB transmission power of base station 415 from base station 405 and receive the SSB transmissions from base station 415 according to the indicated transmission power (e.g., the second transmission power). For example, UE 410 may measure the receive power level of the SSB transmissions received from base station 415. UE 410 may use the indicated SSB transmission power of base station 415 relative to the default SSB transmission power of base station 415 in combination with the receive power level to determine channel information (e.g., CSI) for the channel between UE 410 and base station 415. Base station 405, UE 410, and/or base station 415 may make various handover decisions based, at least to some degree, on the channel information.

Figure 5:
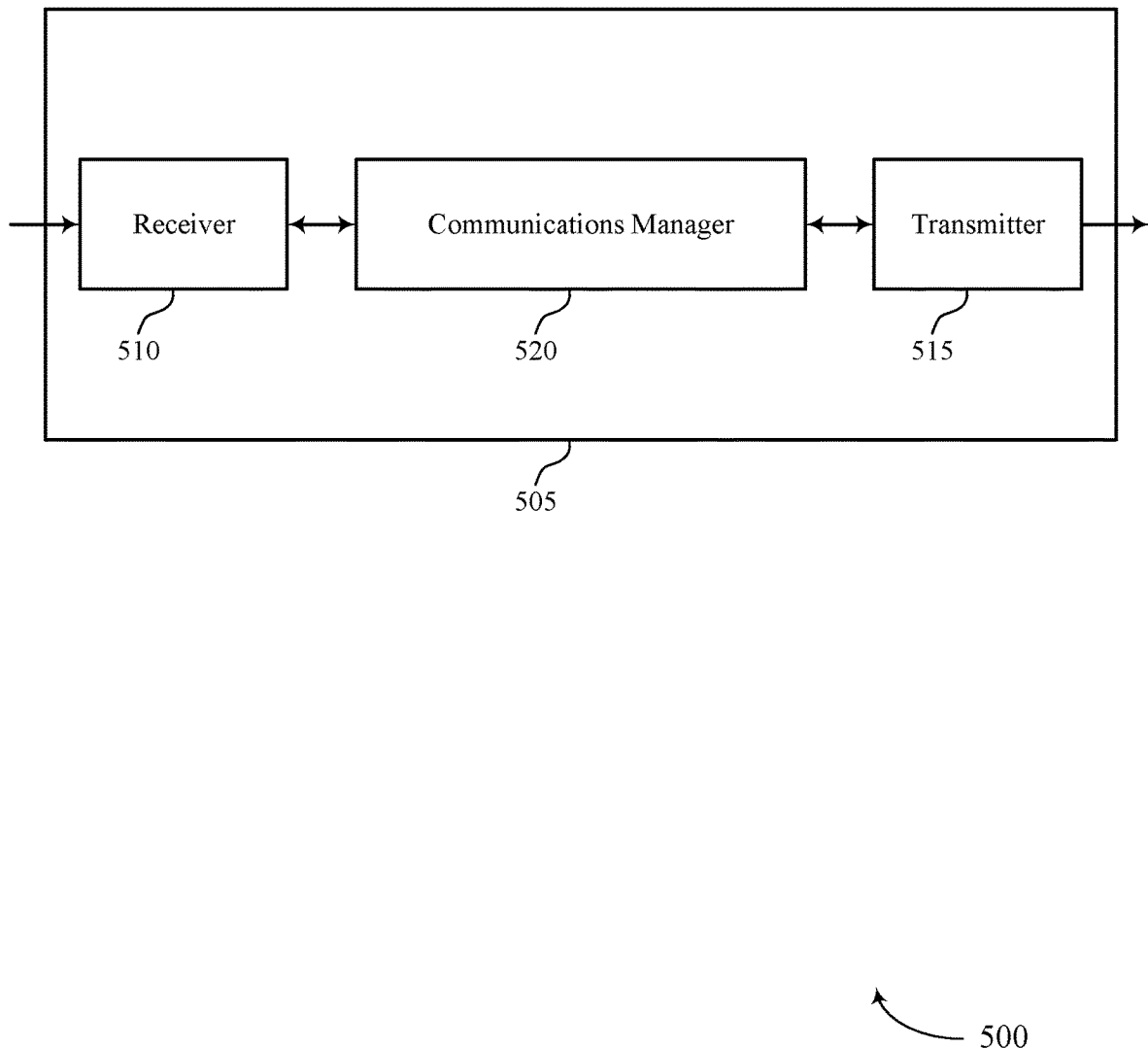
FIGS. 5 and 6 show block diagrams of devices that support power adaptation for SSBs in accordance with aspects of the present disclosure.

FIG. 5 shows a block diagram 500 of a device 505 that supports power adaptation for SSBs in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to power adaptation for SSBs). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to power adaptation for SSBs). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of power adaptation for SSBs as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for receiving an indication of a transmission power for a SSB transmission by a base station, the indicated transmission power different than a default transmission power for SSB transmissions by the base station. The communications manager 520 may be configured as or otherwise support a means for determining a received power with which the SSB transmission is received at the UE. The communications manager 520 may be configured as or otherwise support a means for receiving one or more downlink transmissions from the base station based on the received power for the SSB transmission and a difference between the default transmission power and the indicated transmission power for the SSB transmission.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for a base station to indicate the actual SSB transmission power (e.g., relative to the default SSB transmission power) being used to improve channel estimation by the UE.

Figure 6:
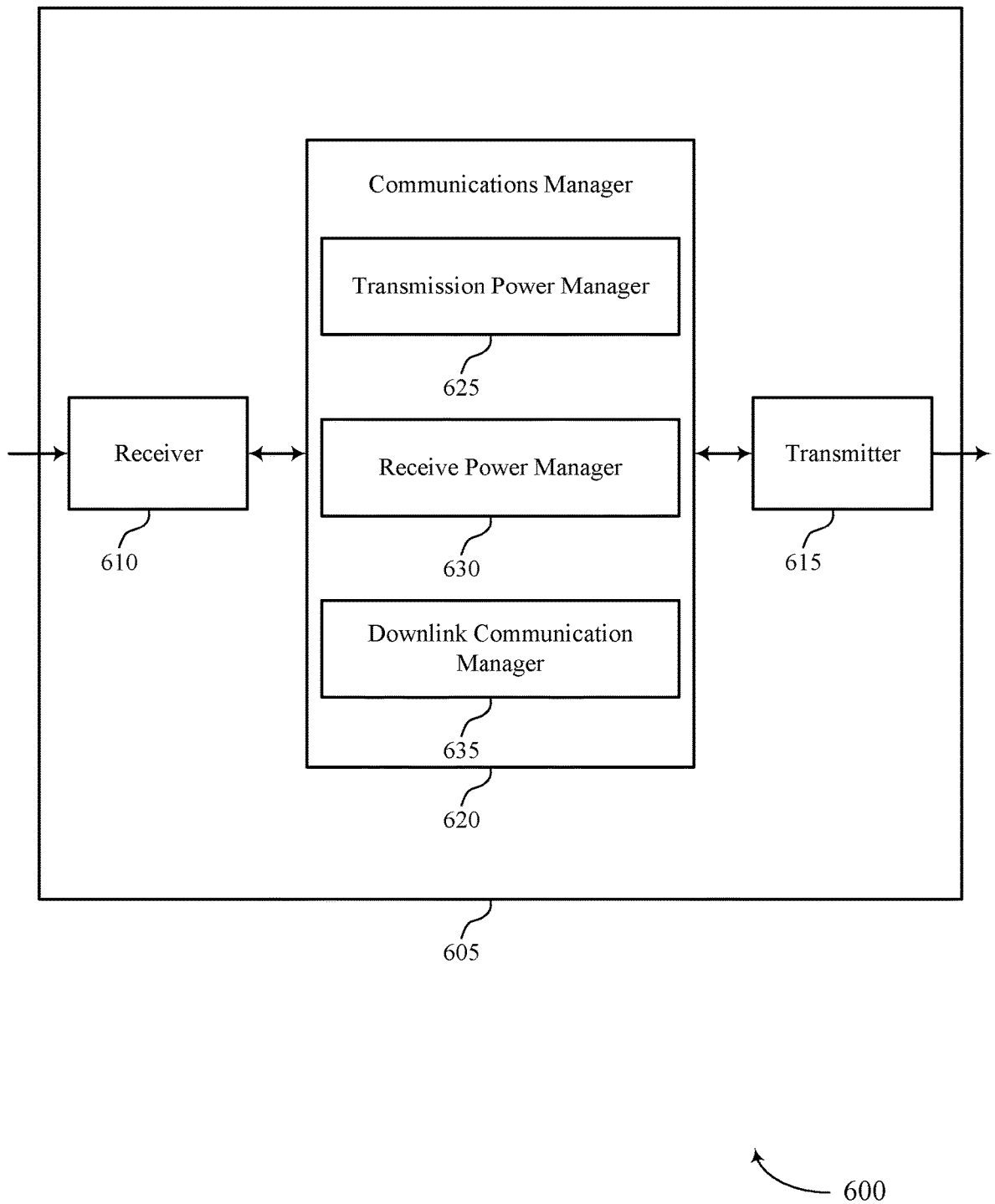

FIG. 6 shows a block diagram 600 of a device 605 that supports power adaptation for SSBs in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to power adaptation for SSBs). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to power adaptation for SSBs). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of power adaptation for SSBs as described herein. For example, the communications manager 620 may include a transmission power manager 625, a receive power manager 630, a downlink communication manager 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The transmission power manager 625 may be configured as or otherwise support a means for receiving an indication of a transmission power for a SSB transmission by a base station, the indicated transmission power different than a default transmission power for SSB transmissions by the base station. The receive power manager 630 may be configured as or otherwise support a means for determining a received power with which the SSB transmission is received at the UE. The downlink communication manager 635 may be configured as or otherwise support a means for receiving one or more downlink transmissions from the base station based on the received power for the SSB transmission and a difference between the default transmission power and the indicated transmission power for the SSB transmission.

Figure 7:
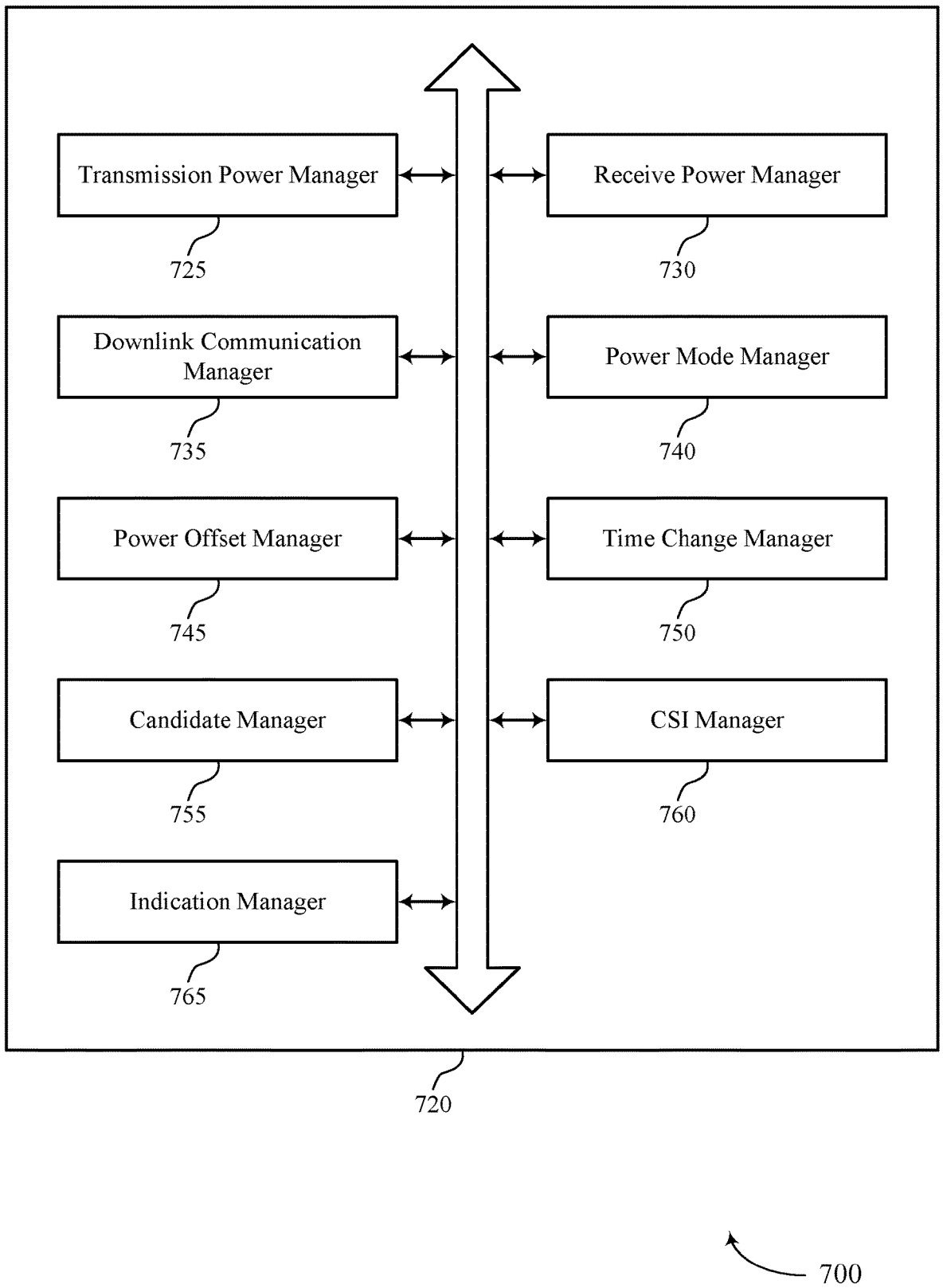
FIG. 7 shows a block diagram of a communications manager that supports power adaptation for SSBs in accordance with aspects of the present disclosure.

FIG. 7 shows a block diagram 700 of a communications manager 720 that supports power adaptation for SSBs in accordance with aspects of the present disclosure. The communications manager 720 may be an example of aspects of a communications manager 520, a communications manager 620, or both, as described herein. The communications manager 720, or various components thereof, may be an example of means for performing various aspects of power adaptation for SSBs as described herein. For example, the communications manager 720 may include a transmission power manager 725, a receive power manager 730, a downlink communication manager 735, a power mode manager 740, a power offset manager 745, a time change manager 750, a candidate manager 755, a CSI manager 760, an indication manager 765, or any combination thereof. Each of these components may communicate, directly or indirectly, with one another (e.g., via one or more buses).

The communications manager 720 may support wireless communication at a UE in accordance with examples as disclosed herein. The transmission power manager 725 may be configured as or otherwise support a means for receiving an indication of a transmission power for a SSB transmission by a base station, the indicated transmission power different than a default transmission power for SSB transmissions by the base station. The receive power manager 730 may be configured as or otherwise support a means for determining a received power with which the SSB transmission is received at the UE. The downlink communication manager 735 may be configured as or otherwise support a means for receiving one or more downlink transmissions from the base station based on the received power for the SSB transmission and a difference between the default transmission power and the indicated transmission power for the SSB transmission.

In some examples, the power mode manager 740 may be configured as or otherwise support a means for receiving, from the base station, signaling that indicates a set of multiple power modes for the base station, where the indication of the transmission power identifies a power mode of the set of multiple power modes.

In some examples, the power mode corresponds to the difference between the default transmission power and the indicated transmission power, a configuration of antenna panels or subpanels, a quantity of transmission beams, a pattern of transmission beams, or any combination thereof, for a set of SSB transmissions by the base station that includes the SSB transmission.

In some examples, the indication of the transmission power or additional signaling received by the UE includes an indication of a quantity of antenna panels or subpanels used by the base station for the SSB transmission.

In some examples, the indication of the quantity of antenna panels or subpanels or second additional signaling received by the UE indicates a respective identifier associated with each antenna panel or subpanel included in the quantity of antenna panels or subpanels.

In some examples, to support receiving the indication of the transmission power, the power offset manager 745 may be configured as or otherwise support a means for receiving an indication of a power offset for the SSB transmission from the base station, the power offset corresponding to the difference between the indicated transmission power and the default transmission power.

In some examples, the time change manager 750 may be configured as or otherwise support a means for receiving, from the base station, an indication of a time for a change from the indicated transmission power to a second transmission power for subsequent SSB transmissions by the base station.

In some examples, the indication of the time for the change indicates at least one of a start time for the second transmission power, a duration of time until the change, a quantity of symbols until the change, a quantity of slots until the change, a quantity of frames until the change, or any combination thereof.

In some examples, the candidate manager 755 may be configured as or otherwise support a means for receiving, from the base station, signaling that indicates a second transmission power for SSB transmissions by a candidate cell available for handover of the UE. In some examples, the candidate manager 755 may be configured as or otherwise support a means for receiving a SSB transmission from the candidate cell according to the second transmission power. In some examples, the signaling that indicates the second transmission power includes RRC signaling, MAC CE signaling, DCI signaling, or any combination thereof.

In some examples, the signaling that indicates the second transmission power is received based on a periodic schedule, based on a change to the second transmission power by the candidate cell, based on a system information request transmitted by the UE, or any combination thereof.

In some examples, the CSI manager 760 may be configured as or otherwise support a means for transmitting, to the base station, channel information based on the received power at the UE for the SSB transmission, where receiving the one or more downlink transmissions based on the received power and the difference between the default transmission power and the indicated transmission power for the SSB transmission includes. In some examples, the CSI manager 760 may be configured as or otherwise support a means for receiving a downlink transmission based on one or more transmission or reception parameters that are based on the channel information and the difference between the default transmission power and the indicated transmission power for the SSB transmission.

In some examples, the power offset manager 745 may be configured as or otherwise support a means for receiving an indication of a power offset for a downlink transmission of the one or more downlink transmissions, the power offset relative to the default transmission power for the SSB transmission, where receiving the one or more downlink transmissions based on the received power and the difference between the default transmission power and the indicated transmission power for the SSB transmission includes. In some examples, the power offset manager 745 may be configured as or otherwise support a means for receiving the downlink transmission based on the indicated power offset for the downlink transmission, the received power for the SSB, and the difference between the default transmission power and the indicated transmission power for the SSB.

In some examples, to support receiving the indication of the transmission power, the indication manager 765 may be configured as or otherwise support a means for receiving MIB signaling, SIB signaling, RRC signaling, DCI signaling, or any combination thereof that includes the indication of the transmission power.

In some examples, the indicated transmission power corresponds to an EPRE for the SSB transmission.

Figure 8:
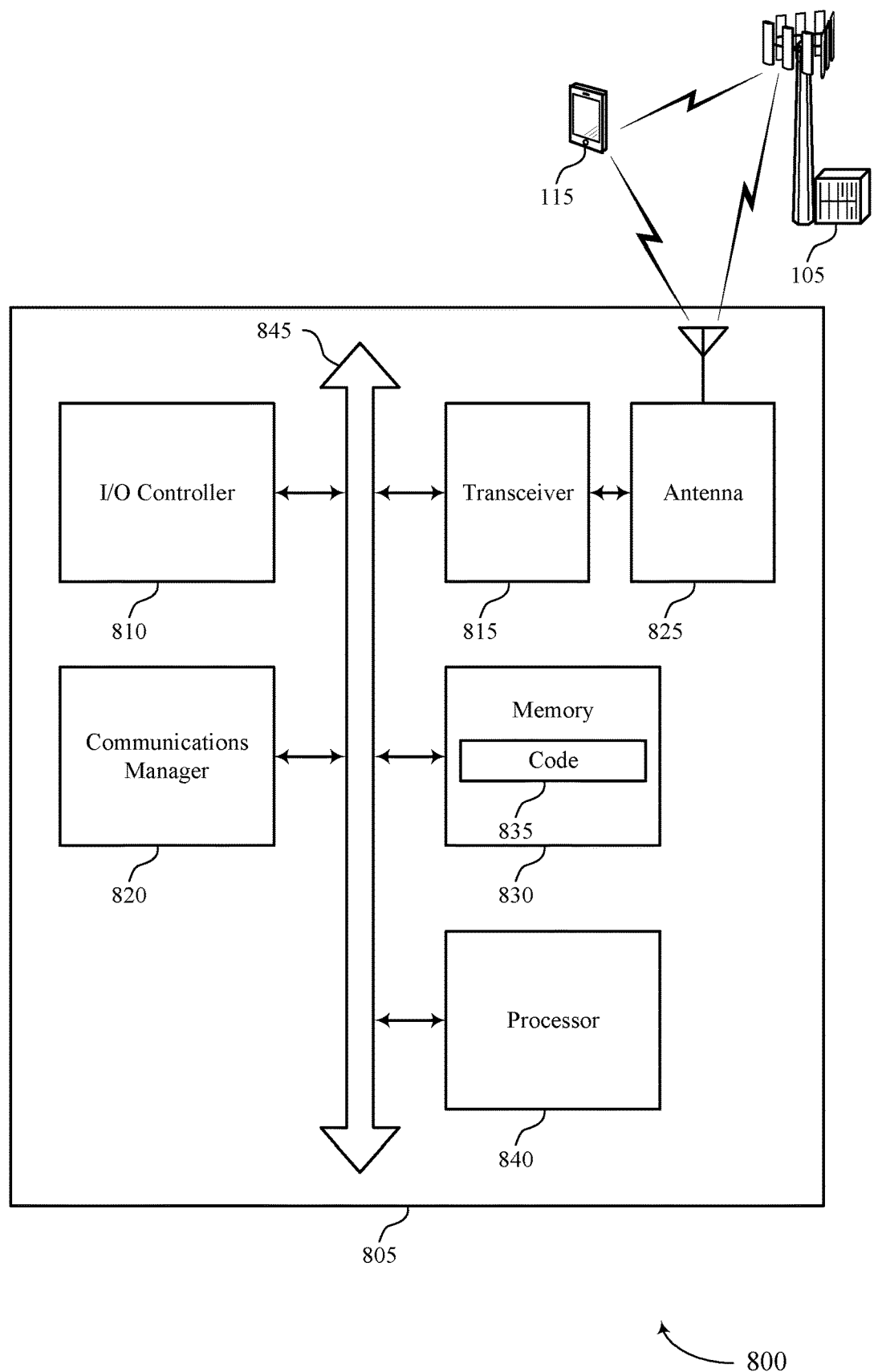
FIG. 8 shows a diagram of a system including a device that supports power adaptation for SSBs in accordance with aspects of the present disclosure.

FIG. 8 shows a diagram of a system 800 including a device 805 that supports power adaptation for SSBs in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting power adaptation for SSBs). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving an indication of a transmission power for a SSB transmission by a base station, the indicated transmission power different than a default transmission power for SSB transmissions by the base station. The communications manager 820 may be configured as or otherwise support a means for determining a received power with which the SSB transmission is received at the UE. The communications manager 820 may be configured as or otherwise support a means for receiving one or more downlink transmissions from the base station based on the received power for the SSB transmission and a difference between the default transmission power and the indicated transmission power for the SSB transmission.

By including or configuring the communications manager 820 in accordance with examples as described herein, the device 805 may support techniques for a base station to indicate the actual SSB transmission power (e.g., relative to the default SSB transmission power) being used to improve channel estimation by the UE.

In some examples, the communications manager 820 may be configured to perform various operations (e.g., receiving, monitoring, transmitting) using or otherwise in cooperation with the transceiver 815, the one or more antennas 825, or any combination thereof. For example, the communications manager 820 may be configured to receive or transmit messages or other signaling as described herein via the transceiver 815. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of power adaptation for SSBs as described herein, or the processor 840 and the memory 830 may be otherwise configured to perform or support such operations.

Figure 9:
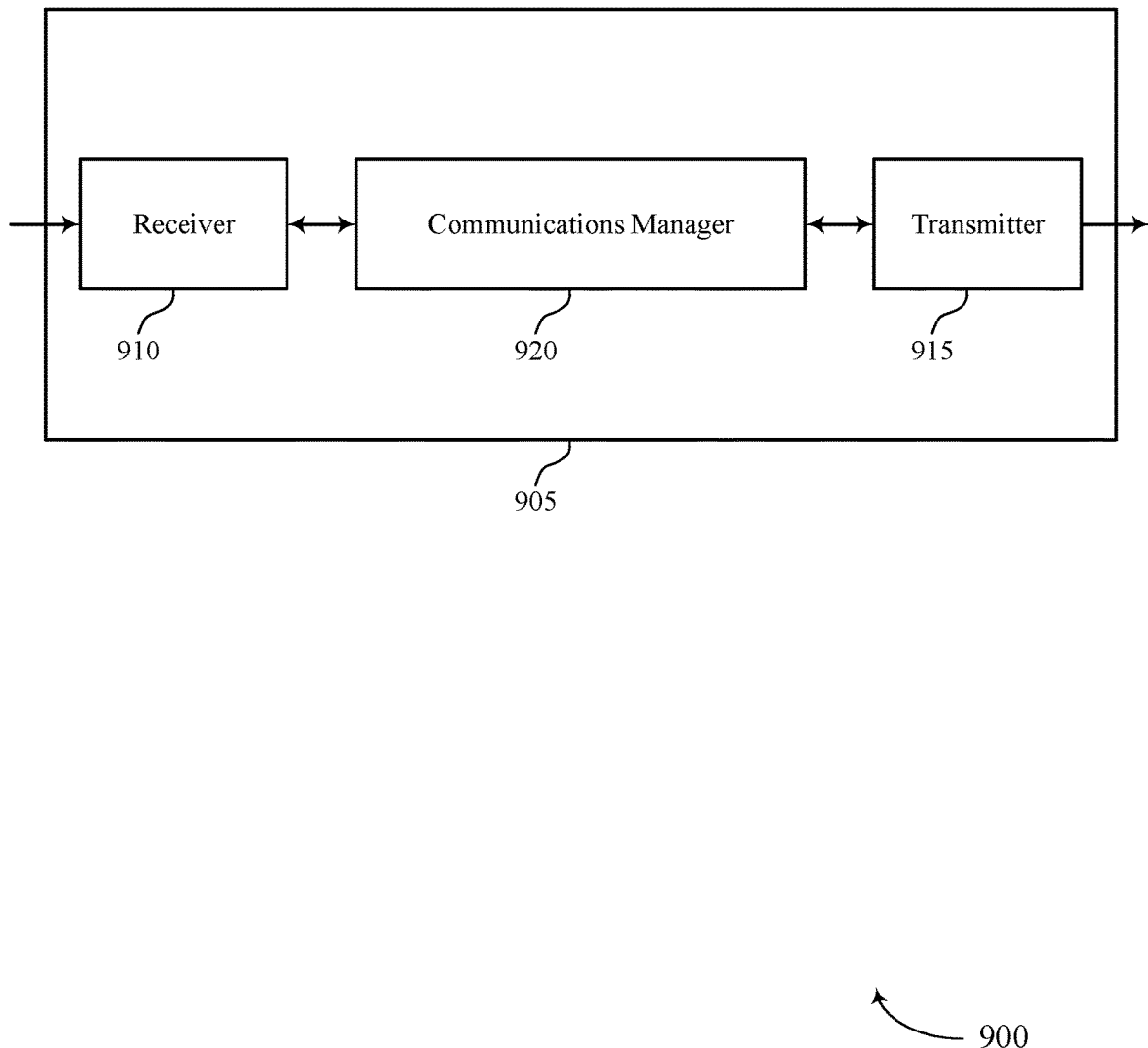
FIGS. 9 and 10 show block diagrams of devices that support power adaptation for SSBs in accordance with aspects of the present disclosure.

FIG. 9 shows a block diagram 900 of a device 905 that supports power adaptation for SSBs in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to power adaptation for SSBs). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to power adaptation for SSBs). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of power adaptation for SSBs as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. For example, the communications manager 920 may be configured as or otherwise support a means for transmitting, to a UE, an indication of a transmission power for a SSB transmission by the base station, the indicated transmission power different than a default transmission power for SSB transmissions by the base station. The communications manager 920 may be configured as or otherwise support a means for transmitting the SSB transmission at a transmit power level corresponding to the indicated transmission power. The communications manager 920 may be configured as or otherwise support a means for transmitting one or more downlink transmissions to the UE based on a received power at the UE for the SSB transmission and a difference between the default transmission power and the indicated transmission power for the SSB transmission.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for a base station to indicate the actual SSB transmission power (e.g., relative to the default SSB transmission power) being used to improve channel estimation by the UE.

Figure 10:
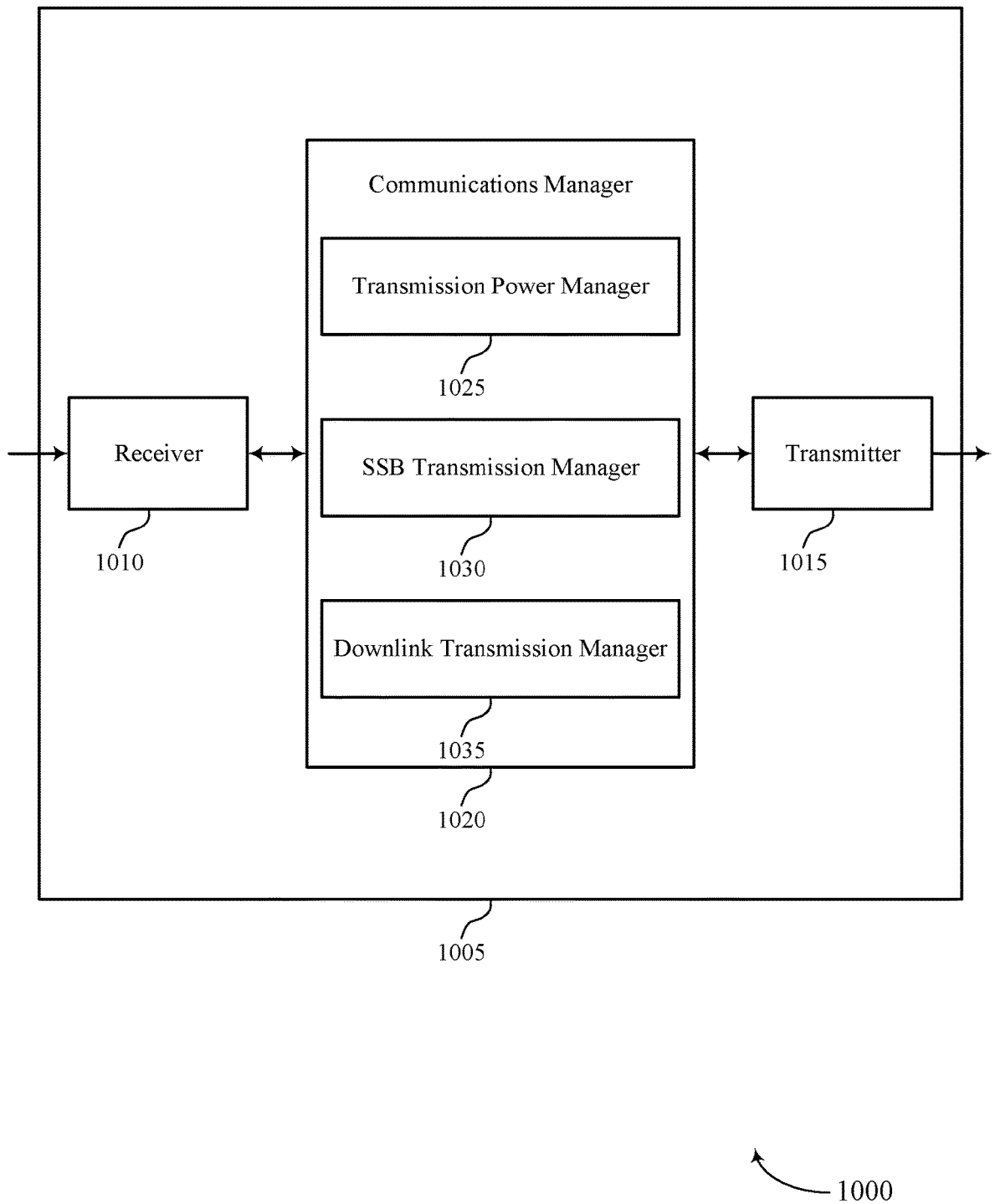

FIG. 10 shows a block diagram 1000 of a device 1005 that supports power adaptation for SSBs in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to power adaptation for SSBs).

Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to power adaptation for SSBs). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of power adaptation for SSBs as described herein. For example, the communications manager 1020 may include a transmission power manager 1025, an SSB transmission manager 1030, a downlink transmission manager 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. The transmission power manager 1025 may be configured as or otherwise support a means for transmitting, to a UE, an indication of a transmission power for a SSB transmission by the base station, the indicated transmission power different than a default transmission power for SSB transmissions by the base station. The SSB transmission manager 1030 may be configured as or otherwise support a means for transmitting the SSB transmission at a transmit power level corresponding to the indicated transmission power. The downlink transmission manager 1035 may be configured as or otherwise support a means for transmitting one or more downlink transmissions to the UE based on a received power at the UE for the SSB transmission and a difference between the default transmission power and the indicated transmission power for the SSB transmission.

Figure 11:
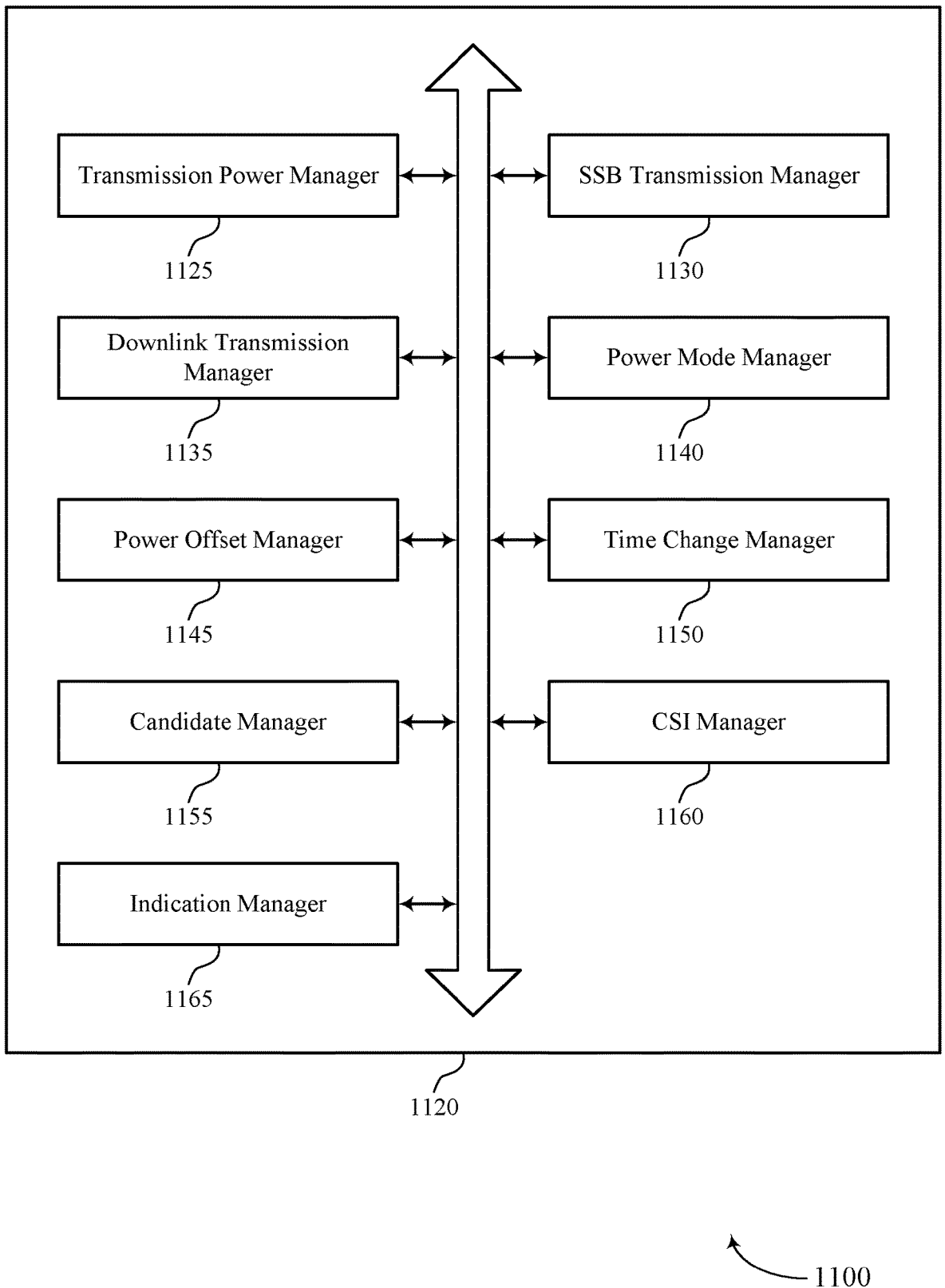
FIG. 11 shows a block diagram of a communications manager that supports power adaptation for SSBs in accordance with aspects of the present disclosure.

FIG. 11 shows a block diagram 1100 of a communications manager 1120 that supports power adaptation for SSBs in accordance with aspects of the present disclosure. The communications manager 1120 may be an example of aspects of a communications manager 920, a communications manager 1020, or both, as described herein. The communications manager 1120, or various components thereof, may be an example of means for performing various aspects of power adaptation for SSBs as described herein. For example, the communications manager 1120 may include a transmission power manager 1125, an SSB transmission manager 1130, a downlink transmission manager 1135, a power mode manager 1140, a power offset manager 1145, a time change manager 1150, a candidate manager 1155, a CSI manager 1160, an indication manager 1165, or any combination thereof. Each of these components may communicate, directly or indirectly, with one another (e.g., via one or more buses).

The communications manager 1120 may support wireless communication at a base station in accordance with examples as disclosed herein. The transmission power manager 1125 may be configured as or otherwise support a means for transmitting, to a UE, an indication of a transmission power for a SSB transmission by the base station, the indicated transmission power different than a default transmission power for SSB transmissions by the base station. The SSB transmission manager 1130 may be configured as or otherwise support a means for transmitting the SSB transmission at a transmit power level corresponding to the indicated transmission power. The downlink transmission manager 1135 may be configured as or otherwise support a means for transmitting one or more downlink transmissions to the UE based on a received power at the UE for the SSB transmission and a difference between the default transmission power and the indicated transmission power for the SSB transmission.

In some examples, the power mode manager 1140 may be configured as or otherwise support a means for transmitting, to the UE, signaling that indicates a set of multiple power modes for the base station, where the indication of the transmission power identifies a power mode of the set of multiple power modes.

In some examples, the power mode corresponds to the difference between the default transmission power and the indicated transmission power, a configuration of antenna panels or subpanels, a quantity of transmission beams, a pattern of transmission beams, or any combination thereof, for a set of SSB transmissions by the base station that includes the SSB transmission. In some examples, the indication of the transmission power or additional signaling transmitted to the UE includes an indication of a quantity of antenna panels or subpanels used by the base station for the SSB transmission. In some examples, the indication of the quantity of antenna panels or subpanels or second additional signaling transmitted to the UE indicates a respective identifier associated with each antenna panel or subpanel included in the quantity of antenna panels or subpanels.

In some examples, to support transmitting the indication of the transmission power, the power offset manager 1145 may be configured as or otherwise support a means for transmitting, to the UE, an indication of a power offset for the SSB transmission from the base station, the power offset corresponding to the difference between the indicated transmission power and the default transmission power.

In some examples, the time change manager 1150 may be configured as or otherwise support a means for transmitting, to the UE, an indication of a time for a change from the indicated transmission power to a second transmission power for subsequent SSB transmissions by the base station. In some examples, the indication of the time for the change indicates at least one of a start time for the second transmission power, a duration of time until the change, a quantity of symbols until the change, a quantity of slots until the change, a quantity of frames until the change, or any combination thereof.

In some examples, the candidate manager 1155 may be configured as or otherwise support a means for transmitting, to the UE, signaling that indicates a second transmission power for SSB transmissions by a candidate cell available for handover of the UE. In some examples, the signaling that indicates the second transmission power includes RRC signaling, MAC CE signaling, DCI signaling, or any combination thereof. In some examples, the signaling that indicates the second transmission power is transmitted based on a periodic schedule, based on a change to the second transmission power by the candidate cell, based on a system information request transmitted by the UE, or any combination thereof.

In some examples, to support transmitting the one or more downlink transmissions based on the received power and the difference between the default transmission power and the indicated transmission power for the SSB transmission, the CSI manager 1160 may be configured as or otherwise support a means for receiving, from the UE, channel information based on the received power at the UE for the SSB transmission. In some examples, to support transmitting the one or more downlink transmissions based on the received power and the difference between the default transmission power and the indicated transmission power for the SSB transmission, the CSI manager 1160 may be configured as or otherwise support a means for configuring one or more parameters for transmitting the one or more downlink transmissions based on the channel information and the difference between the default transmission power and the indicated transmission power for the SSB transmission.

In some examples, to support transmitting the indication of the transmission power, the indication manager 1165 may be configured as or otherwise support a means for transmitting MIB signaling, MAC CE signaling, RRC signaling, DCI signaling, or any combination thereof that includes the indication of the transmission power.

In some examples, the transmission power corresponds to a respective energy per-resource element value for the SSB transmission from the base station.

Figure 12:
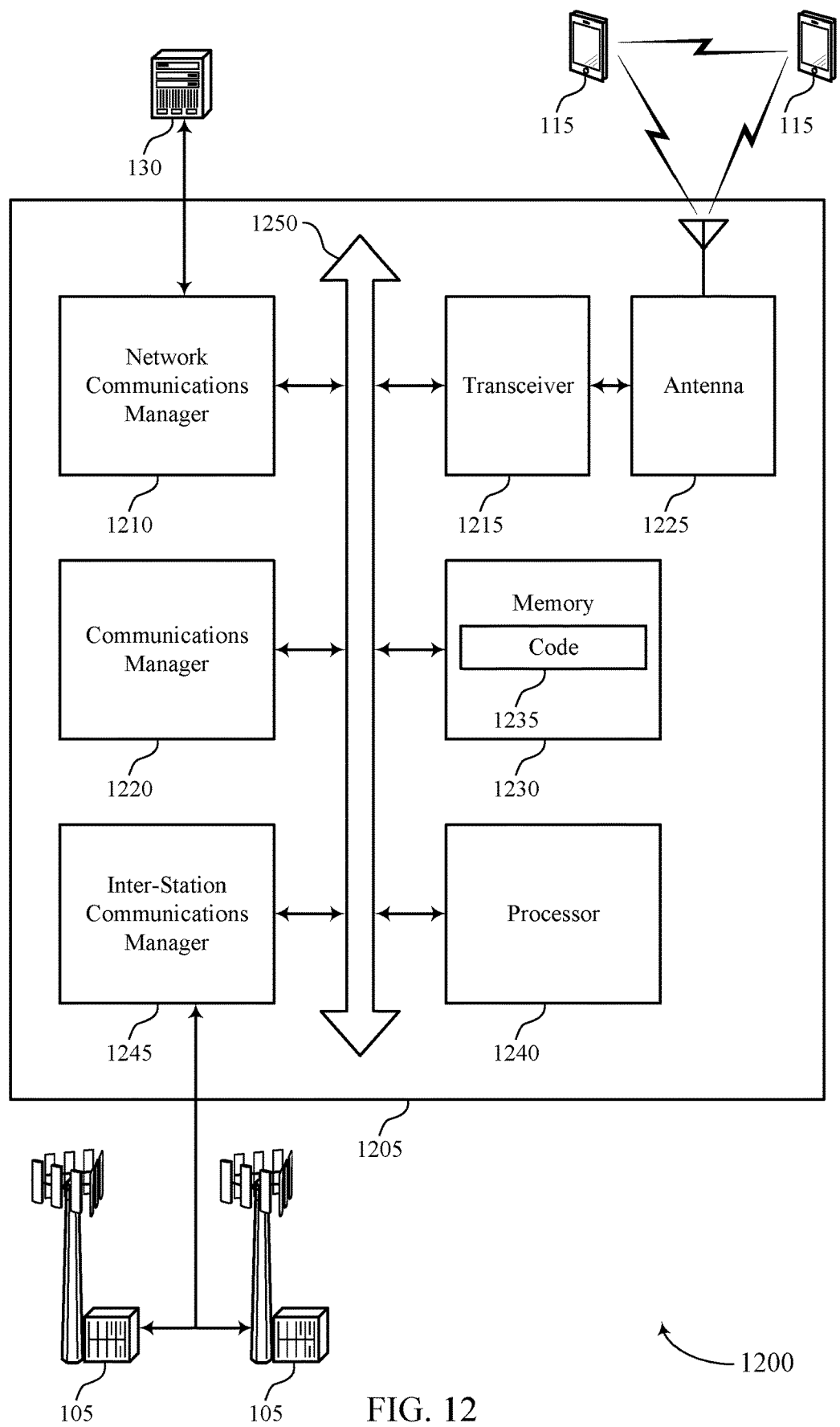
FIG. 12 shows a diagram of a system including a device that supports power adaptation for SSBs in accordance with aspects of the present disclosure.

FIG. 12 shows a diagram of a system 1200 including a device 1205 that supports power adaptation for SSBs in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting power adaptation for SSBs). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a base station in accordance with examples as disclosed herein. For example, the communications manager 1220 may be configured as or otherwise support a means for transmitting, to a UE, an indication of a transmission power for a SSB transmission by the base station, the indicated transmission power different than a default transmission power for SSB transmissions by the base station. The communications manager 1220 may be configured as or otherwise support a means for transmitting the SSB transmission at a transmit power level corresponding to the indicated transmission power. The communications manager 1220 may be configured as or otherwise support a means for transmitting one or more downlink transmissions to the UE based on a received power at the UE for the SSB transmission and a difference between the default transmission power and the indicated transmission power for the SSB transmission.

By including or configuring the communications manager 1220 in accordance with examples as described herein, the device 1205 may support techniques for a base station to indicate the actual SSB transmission power (e.g., relative to the default SSB transmission power) being used to improve channel estimation by the UE.

In some examples, the communications manager 1220 may be configured to perform various operations (e.g., receiving, monitoring, transmitting) using or otherwise in cooperation with the transceiver 1215, the one or more antennas 1225, or any combination thereof. For example, the communications manager 1220 may be configured to receive or transmit messages or other signaling as described herein via the transceiver 1215. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of power adaptation for SSBs as described herein, or the processor 1240 and the memory 1230 may be otherwise configured to perform or support such operations.

Figure 13:
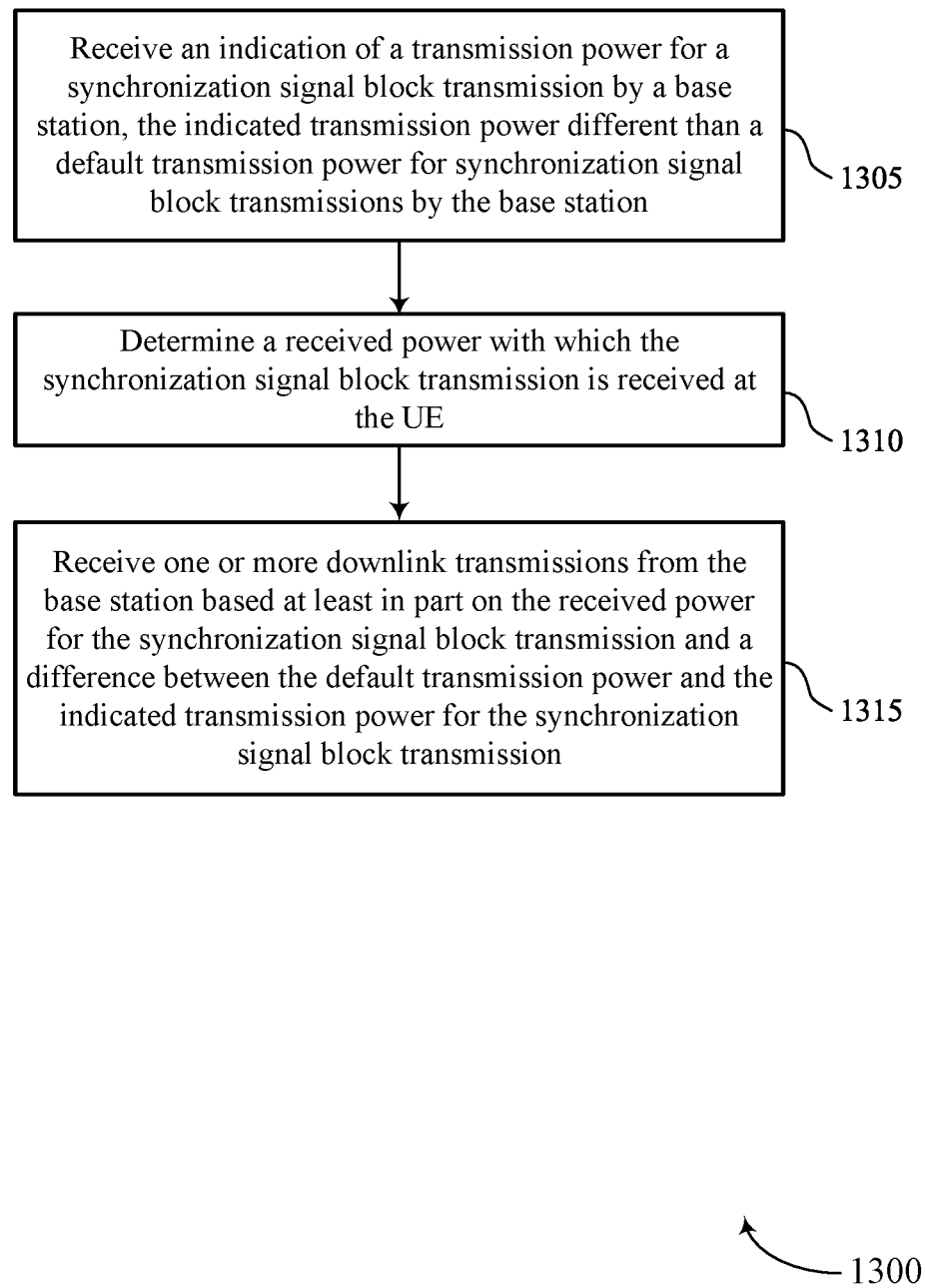
FIGS. 13 through 17 show flowcharts illustrating methods that support power adaptation for SSBs in accordance with aspects of the present disclosure.

FIG. 13 shows a flowchart illustrating a method 1300 that supports power adaptation for SSBs in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving an indication of a transmission power for a SSB transmission by a base station, the indicated transmission power different than a default transmission power for SSB transmissions by the base station. The operations of 1305 may be performed in accordance with examples as disclosed herein. In some examples, aspects of the operations of 1305 may be performed by a transmission power manager 725 as described with reference to FIG. 7. Additionally or alternatively, means for performing 1305 may, but not necessarily, include, for example, antenna 825, transceiver 815, communications manager 820, memory 830 (including code 835), processor 840, or bus 845.

At 1310, the method may include determining a received power with which the SSB transmission is received at the UE. The operations of 1310 may be performed in accordance with examples as disclosed herein. In some examples, aspects of the operations of 1310 may be performed by a receive power manager 730 as described with reference to FIG. 7. Additionally or alternatively, means for performing 1310 may, but not necessarily, include, for example, antenna 825, transceiver 815, communications manager 820, memory 830 (including code 835), processor 840, or bus 845.

At 1315, the method may include receiving one or more downlink transmissions from the base station based on the received power for the SSB transmission and a difference between the default transmission power and the indicated transmission power for the SSB transmission. The operations of 1315 may be performed in accordance with examples as disclosed herein. In some examples, aspects of the operations of 1315 may be performed by a downlink communication manager 735 as described with reference to FIG. 7. Additionally or alternatively, means for performing 1315 may, but not necessarily, include, for example, antenna 825, transceiver 815, communications manager 820, memory 830 (including code 835), processor 840, or bus 845.

Figure 14:
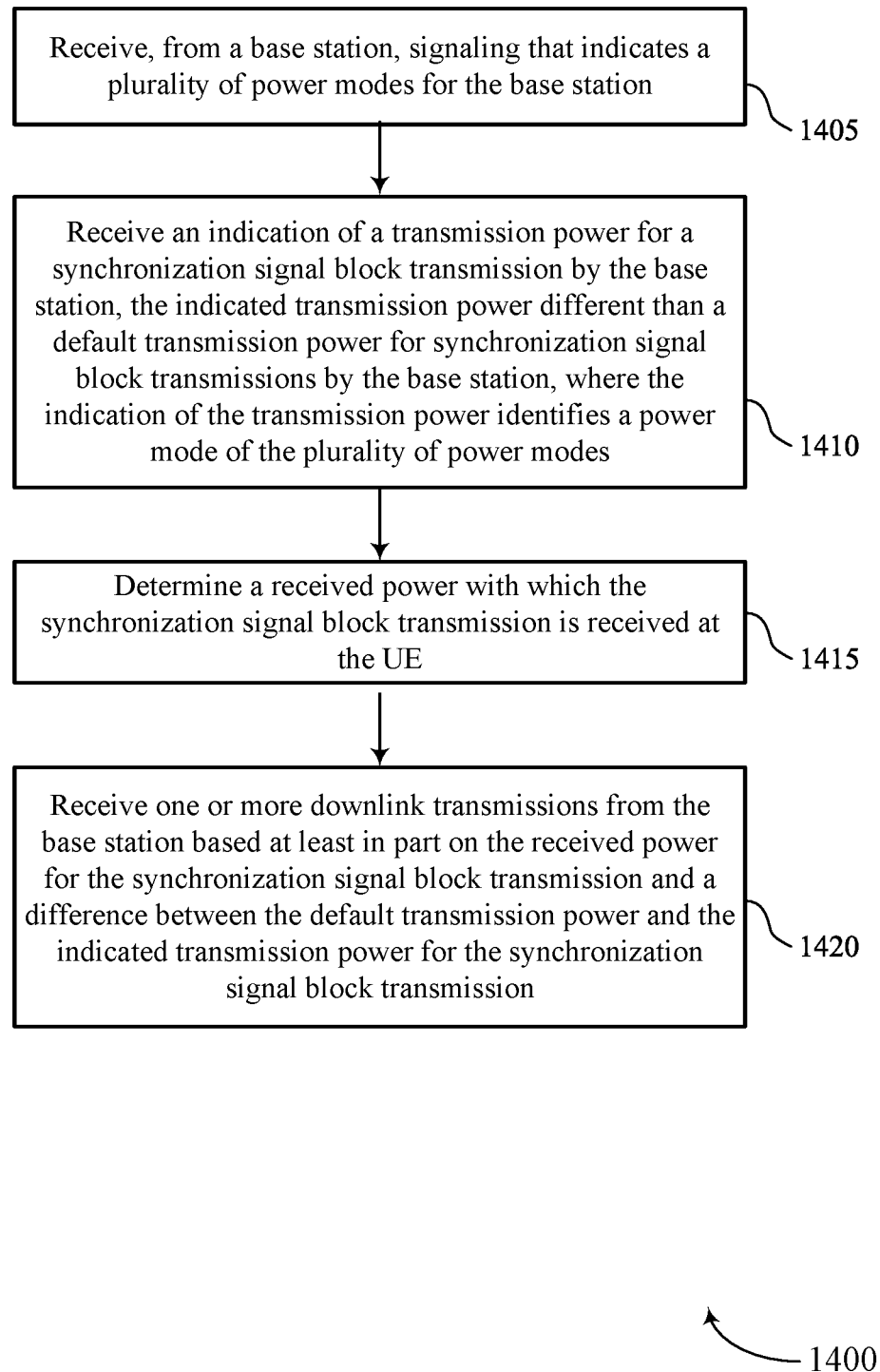

FIG. 14 shows a flowchart illustrating a method 1400 that supports power adaptation for SSBs in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, signaling that indicates a set of multiple power modes for the base station. The operations of 1405 may be performed in accordance with examples as disclosed herein. In some examples, aspects of the operations of 1405 may be performed by a transmission power manager 725 as described with reference to FIG. 7. Additionally or alternatively, means for performing 1405 may, but not necessarily, include, for example, antenna 825, transceiver 815, communications manager 820, memory 830 (including code 835), processor 840, or bus 845.

At 1410, the method may include receiving an indication of a transmission power for a SSB transmission by a base station, the indicated transmission power different than a default transmission power for SSB transmissions by the base station, where the indication of the transmission power identifies a power mode of the set of multiple power modes. The operations of 1410 may be performed in accordance with examples as disclosed herein. In some examples, aspects of the operations of 1410 may be performed by a power mode manager 740 as described with reference to FIG. 7. Additionally or alternatively, means for performing 1410 may, but not necessarily, include, for example, antenna 825, transceiver 815, communications manager 820, memory 830 (including code 835), processor 840, or bus 845.

At 1415, the method may include determining a received power with which the SSB transmission is received at the UE. The operations of 1415 may be performed in accordance with examples as disclosed herein. In some examples, aspects of the operations of 1415 may be performed by a receive power manager 730 as described with reference to FIG. 7. Additionally or alternatively, means for performing 1415 may, but not necessarily, include, for example, antenna 825, transceiver 815, communications manager 820, memory 830 (including code 835), processor 840, or bus 845.

At 1420, the method may include receiving one or more downlink transmissions from the base station based on the received power for the SSB transmission and a difference between the default transmission power and the indicated transmission power for the SSB transmission. The operations of 1420 may be performed in accordance with examples as disclosed herein. In some examples, aspects of the operations of 1420 may be performed by a downlink communication manager 735 as described with reference to FIG. 7. Additionally or alternatively, means for performing 1420 may, but not necessarily, include, for example, antenna 825, transceiver 815, communications manager 820, memory 830 (including code 835), processor 840, or bus 845.

Figure 15:
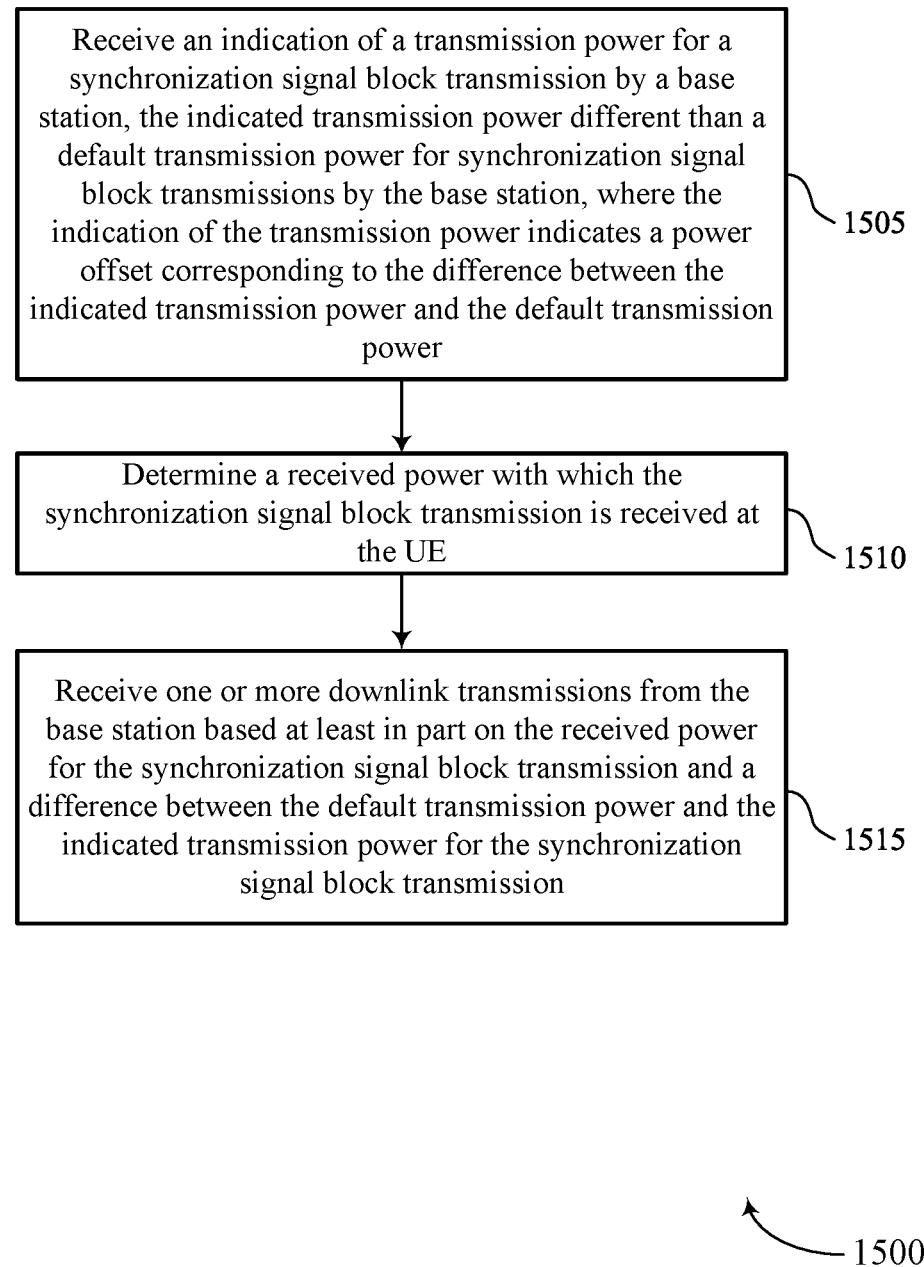

FIG. 15 shows a flowchart illustrating a method 1500 that supports power adaptation for SSBs in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include receiving an indication of a transmission power for a SSB transmission by a base station, the indicated transmission power different than a default transmission power for SSB transmissions by the base station, where the indication of the transmission power indicates a power offset corresponding to the difference between the indicated transmission power and the default transmission power. The operations of 1505 may be performed in accordance with examples as disclosed herein. In some examples, aspects of the operations of 1505 may be performed by a transmission power manager 725, a power offset manager 745, or both, as described with reference to FIG. 7. Additionally or alternatively, means for performing 1505 may, but not necessarily, include, for example, antenna 825, transceiver 815, communications manager 820, memory 830 (including code 835), processor 840, or bus 845.

At 1510, the method may include determining a received power with which the SSB transmission is received at the UE. The operations of 1510 may be performed in accordance with examples as disclosed herein. In some examples, aspects of the operations of 1510 may be performed by a receive power manager 730 as described with reference to FIG. 7. Additionally or alternatively, means for performing 1510 may, but not necessarily, include, for example, antenna 825, transceiver 815, communications manager 820, memory 830 (including code 835), processor 840, or bus 845.

At 1515, the method may include receiving one or more downlink transmissions from the base station based on the received power for the SSB transmission and a difference between the default transmission power and the indicated transmission power for the SSB transmission. The operations of 1515 may be performed in accordance with examples as disclosed herein. In some examples, aspects of the operations of 1515 may be performed by a downlink communication manager 735 as described with reference to FIG. 7. Additionally or alternatively, means for performing 1515 may, but not necessarily, include, for example, antenna 825, transceiver 815, communications manager 820, memory 830 (including code 835), processor 840, or bus 845.

Figure 16:
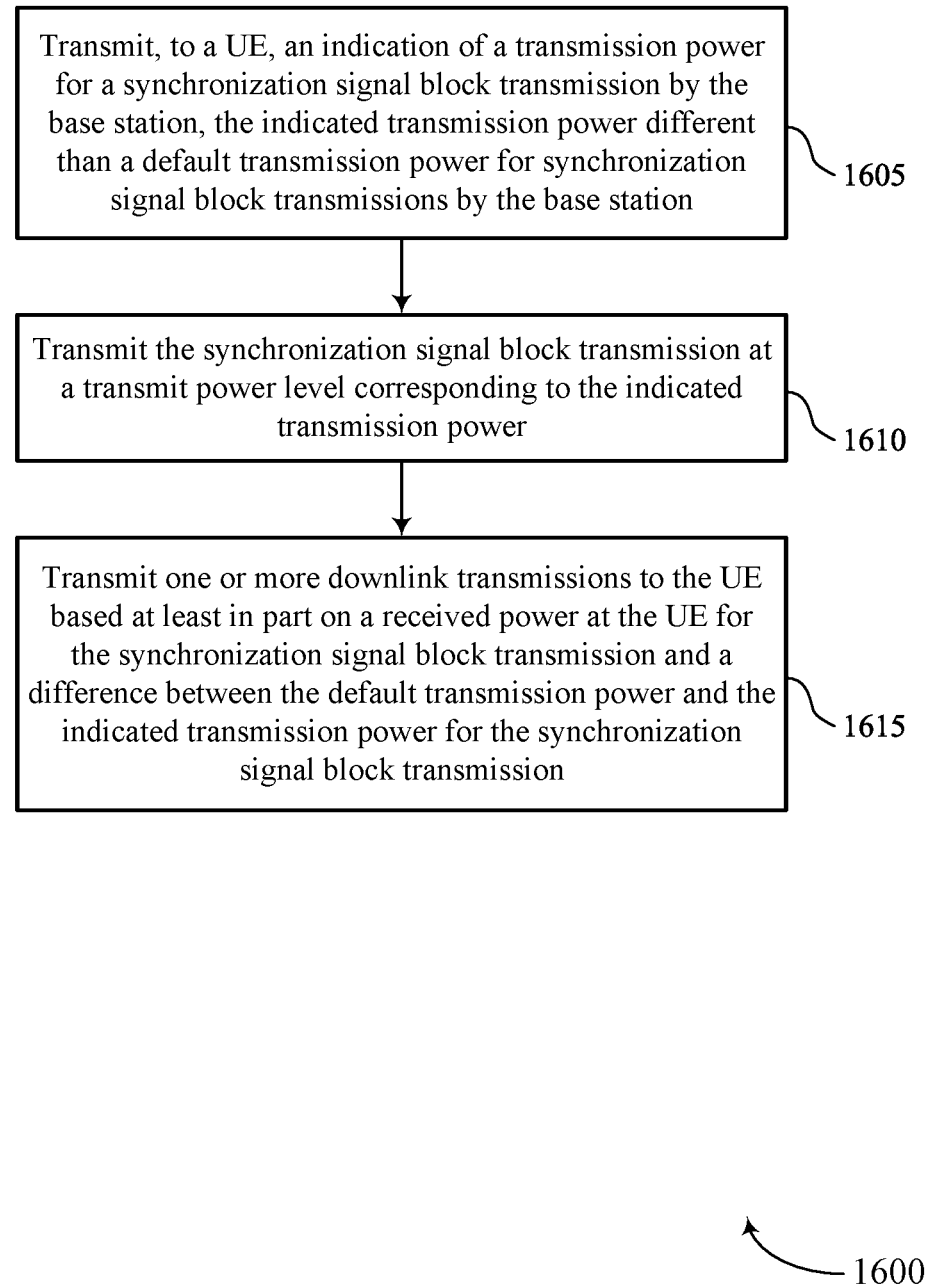

FIG. 16 shows a flowchart illustrating a method 1600 that supports power adaptation for SSBs in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include transmitting, to a UE, an indication of a transmission power for a SSB transmission by the base station, the indicated transmission power different than a default transmission power for SSB transmissions by the base station. The operations of 1605 may be performed in accordance with examples as disclosed herein. In some examples, aspects of the operations of 1605 may be performed by a transmission power manager 1125 as described with reference to FIG. 11. Additionally or alternatively, means for performing 1605 may, but not necessarily, include, for example, antenna 1225, transceiver 1215, communications manager 1220, memory 1230 (including code 1235), processor 1240, or bus 1250.

At 1610, the method may include transmitting the SSB transmission at a transmit power level corresponding to the indicated transmission power. The operations of 1610 may be performed in accordance with examples as disclosed herein. In some examples, aspects of the operations of 1610 may be performed by an SSB transmission manager 1130 as described with reference to FIG. 11. Additionally or alternatively, means for performing 1610 may, but not necessarily, include, for example, antenna 1225, transceiver 1215, communications manager 1220, memory 1230 (including code 1235), processor 1240, or bus 1250.

At 1615, the method may include transmitting one or more downlink transmissions to the UE based on a received power at the UE for the SSB transmission and a difference between the default transmission power and the indicated transmission power for the SSB transmission. The operations of 1615 may be performed in accordance with examples as disclosed herein. In some examples, aspects of the operations of 1615 may be performed by a downlink transmission manager 1135 as described with reference to FIG. 11. Additionally or alternatively, means for performing 1615 may, but not necessarily, include, for example, antenna 1225, transceiver 1215, communications manager 1220, memory 1230 (including code 1235), processor 1240, or bus 1250.

Figure 17:
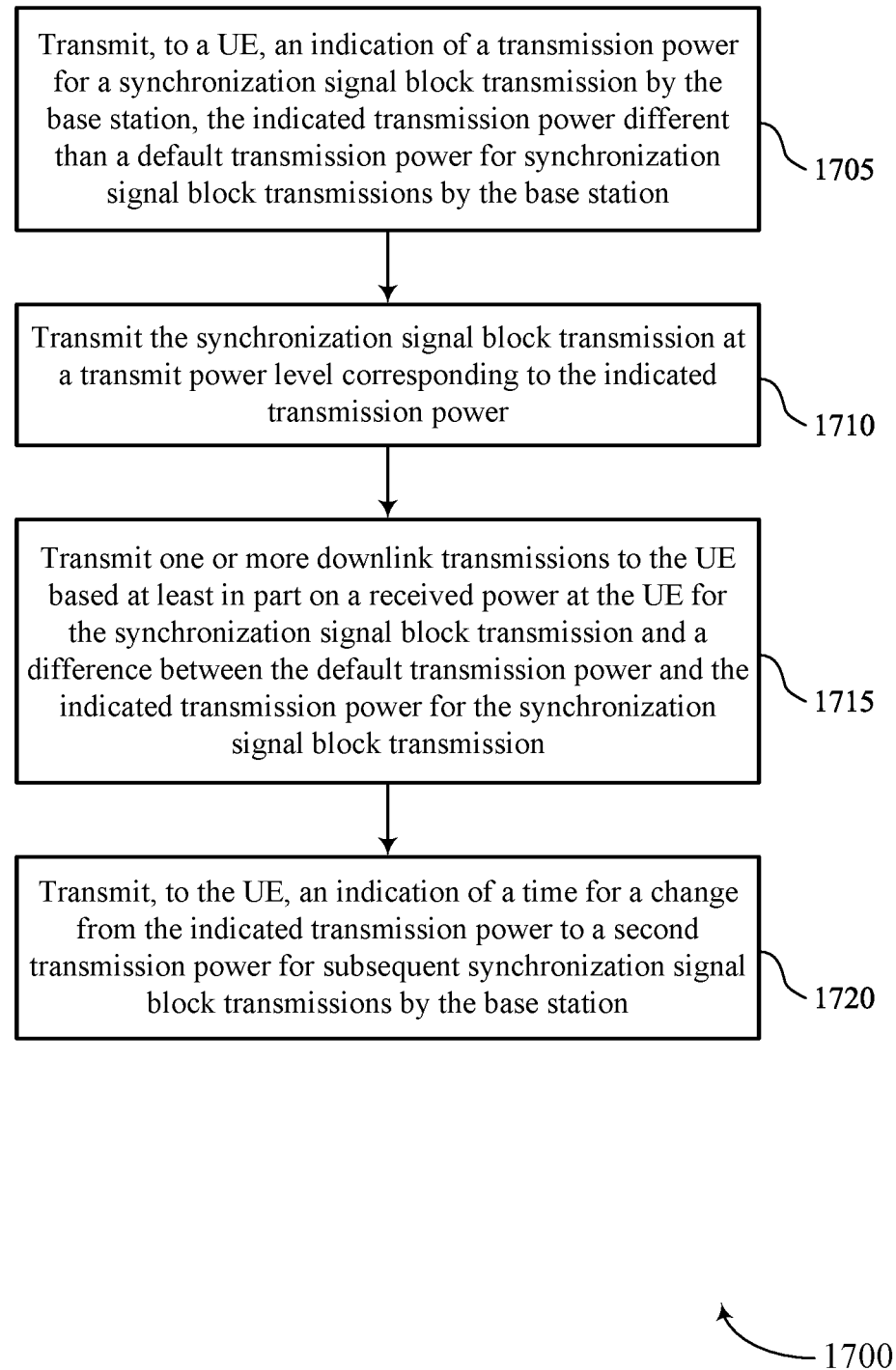

FIG. 17 shows a flowchart illustrating a method 1700 that supports power adaptation for SSBs in accordance with aspects of the present disclosure. The operations of the method 1700 may be implemented by a base station or its components as described herein. For example, the operations of the method 1700 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1705, the method may include transmitting, to a UE, an indication of a transmission power for a SSB transmission by the base station, the indicated transmission power different than a default transmission power for SSB transmissions by the base station. The operations of 1705 may be performed in accordance with examples as disclosed herein. In some examples, aspects of the operations of 1705 may be performed by a transmission power manager 1125 as described with reference to FIG. 11. Additionally or alternatively, means for performing 1705 may, but not necessarily, include, for example, antenna 1225, transceiver 1215, communications manager 1220, memory 1230 (including code 1235), processor 1240, or bus 1250.

At 1710, the method may include transmitting the SSB transmission at a transmit power level corresponding to the indicated transmission power. The operations of 1710 may be performed in accordance with examples as disclosed herein. In some examples, aspects of the operations of 1710 may be performed by an SSB transmission manager 1130 as described with reference to FIG. 11. Additionally or alternatively, means for performing 1710 may, but not necessarily, include, for example, antenna 1225, transceiver 1215, communications manager 1220, memory 1230 (including code 1235), processor 1240, or bus 1250.

At 1715, the method may include transmitting one or more downlink transmissions to the UE based on a received power at the UE for the SSB transmission and a difference between the default transmission power and the indicated transmission power for the SSB transmission. The operations of 1715 may be performed in accordance with examples as disclosed herein. In some examples, aspects of the operations of 1715 may be performed by a downlink transmission manager 1135 as described with reference to FIG. 11. Additionally or alternatively, means for performing 1715 may, but not necessarily, include, for example, antenna 1225, transceiver 1215, communications manager 1220, memory 1230 (including code 1235), processor 1240, or bus 1250.

At 1720, the method may include transmitting, to the UE, an indication of a time for a change from the indicated transmission power to a second transmission power for subsequent SSB transmissions by the base station. The operations of 1720 may be performed in accordance with examples as disclosed herein. In some examples, aspects of the operations of 1720 may be performed by a time change manager 1150 as described with reference to FIG. 11. Additionally or alternatively, means for performing 1720 may, but not necessarily, include, for example, antenna 1225, transceiver 1215, communications manager 1220, memory 1230 (including code 1235), processor 1240, or bus 1250.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: receiving an indication of a transmission power for a SSB transmission by a base station, the indicated transmission power different than a default transmission power for SSB transmissions by the base station; determining a received power with which the SSB transmission is received at the UE; and receiving one or more downlink transmissions from the base station based at least in part on the received power for the SSB transmission and a difference between the default transmission power and the indicated transmission power for the SSB transmission.

Aspect 2: The method of aspect 1, further comprising: receiving, from the base station, signaling that indicates a plurality of power modes for the base station, wherein the indication of the transmission power identifies a power mode of the plurality of power modes.

Aspect 3: The method of aspect 2, wherein the power mode corresponds to the difference between the default transmission power and the indicated transmission power, a configuration of antenna panels or subpanels, a quantity of transmission beams, a pattern of transmission beams, or any combination thereof, for a set of SSB transmissions by the base station that includes the SSB transmission.

Aspect 4: The method of any of aspects 1 through 3, wherein the indication of the transmission power or additional signaling received by the UE comprises an indication of a quantity of antenna panels or subpanels used by the base station for the SSB transmission.

Aspect 5: The method of aspect 4, wherein the indication of the quantity of antenna panels or subpanels or second additional signaling received by the UE indicates a respective identifier associated with each antenna panel or subpanel included in the quantity of antenna panels or subpanels.

Aspect 6: The method of any of aspects 1 through 5, wherein receiving the indication of the transmission power comprises: receiving an indication of a power offset for the SSB transmission from the base station, the power offset corresponding to the difference between the indicated transmission power and the default transmission power.

Aspect 7: The method of any of aspects 1 through 6, further comprising: receiving, from the base station, an indication of a time for a change from the indicated transmission power to a second transmission power for subsequent SSB transmissions by the base station.

Aspect 8: The method of aspect 7, wherein the indication of the time for the change indicates at least one of a start time for the second transmission power, a duration of time until the change, a quantity of symbols until the change, a quantity of slots until the change, a quantity of frames until the change, or any combination thereof.

Aspect 9: The method of any of aspects 1 through 8, further comprising: receiving, from the base station, signaling that indicates a second transmission power for SSB transmissions by a candidate cell available for handover of the UE; and receiving a SSB transmission from the candidate cell according to the second transmission power.

Aspect 10: The method of aspect 9, wherein the signaling that indicates the second transmission power comprises RRC signaling, MAC-CS signaling, DCI signaling, or any combination thereof.

Aspect 11: The method of any of aspects 9 through 10, wherein the signaling that indicates the second transmission power is received based at least in part on a periodic schedule, based at least in part on a change to the second transmission power by the candidate cell, based at least in part on a system information request transmitted by the UE, or any combination thereof.

Aspect 12: The method of any of aspects 1 through 11, further comprising: transmitting, to the base station, channel information based at least in part on the received power at the UE for the SSB transmission, wherein receiving the one or more downlink transmissions based at least in part on the received power and the difference between the default transmission power and the indicated transmission power for the SSB transmission comprises: receiving a downlink transmission based at least in part on one or more transmission or reception parameters that are based at least in part on the channel information and the difference between the default transmission power and the indicated transmission power for the SSB transmission.

Aspect 13: The method of any of aspects 1 through 12, further comprising: receiving an indication of a power offset for a downlink transmission of the one or more downlink transmissions, the power offset relative to the default transmission power for the SSB transmission, wherein receiving the one or more downlink transmissions based at least in part on the received power and the difference between the default transmission power and the indicated transmission power for the SSB transmission comprises: receiving the downlink transmission based at least in part on the indicated power offset for the downlink transmission, the received power for the SSB, and the difference between the default transmission power and the indicated transmission power for the SSB.

Aspect 14: The method of any of aspects 1 through 13, wherein receiving the indication of the transmission power comprises: receiving MIB signaling, SIB signaling, RRC signaling, DCI signaling, or any combination thereof that comprises the indication of the transmission power.

Aspect 15: The method of any of aspects 1 through 14, wherein the indicated transmission power corresponds to an EPRE for the SSB transmission.

Aspect 16: A method for wireless communication at a base station, comprising: transmitting, to a UE, an indication of a transmission power for a SSB transmission by the base station, the indicated transmission power different than a default transmission power for SSB transmissions by the base station; transmitting the SSB transmission at a transmit power level corresponding to the indicated transmission power; and transmitting one or more downlink transmissions to the UE based at least in part on a received power at the UE for the SSB transmission and a difference between the default transmission power and the indicated transmission power for the SSB transmission.

Aspect 17: The method of aspect 16, further comprising: transmitting, to the UE, signaling that indicates a plurality of power modes for the base station, wherein the indication of the transmission power identifies a power mode of the plurality of power modes.

Aspect 18: The method of aspect 17, wherein the power mode corresponds to the difference between the default transmission power and the indicated transmission power, a configuration of antenna panels or subpanels, a quantity of transmission beams, a pattern of transmission beams, or any combination thereof, for a set of SSB transmissions by the base station that includes the SSB transmission.

Aspect 19: The method of any of aspects 16 through 18, wherein the indication of the transmission power or additional signaling transmitted to the UE comprises an indication of a quantity of antenna panels or subpanels used by the base station for the SSB transmission.

Aspect 20: The method of aspect 19, wherein the indication of the quantity of antenna panels or subpanels or second additional signaling transmitted to the UE indicates a respective identifier associated with each antenna panel or subpanel included in the quantity of antenna panels or subpanels.

Aspect 21: The method of any of aspects 16 through 20, wherein transmitting the indication of the transmission power comprises: transmitting, to the UE, an indication of a power offset for the SSB transmission from the base station, the power offset corresponding to the difference between the indicated transmission power and the default transmission power.

Aspect 22: The method of any of aspects 16 through 21, further comprising: transmitting, to the UE, an indication of a time for a change from the indicated transmission power to a second transmission power for subsequent SSB transmissions by the base station.

Aspect 23: The method of aspect 22, wherein the indication of the time for the change indicates at least one of a start time for the second transmission power, a duration of time until the change, a quantity of symbols until the change, a quantity of slots until the change, a quantity of frames until the change, or any combination thereof.

Aspect 24: The method of any of aspects 16 through 23, further comprising: transmitting, to the UE, signaling that indicates a second transmission power for SSB transmissions by a candidate cell available for handover of the UE.

Aspect 25: The method of aspect 24, wherein the signaling that indicates the second transmission power comprises RRC signaling, MAC-CE signaling, DCI signaling, or any combination thereof.

Aspect 26: The method of any of aspects 24 through 25, wherein the signaling that indicates the second transmission power is transmitted based at least in part on a periodic schedule, based at least in part on a change to the second transmission power by the candidate cell, based at least in part on a system information request transmitted by the UE, or any combination thereof.

Aspect 27: The method of any of aspects 16 through 26, wherein transmitting the one or more downlink transmissions based at least in part on the received power and the difference between the default transmission power and the indicated transmission power for the SSB transmission comprises: receiving, from the UE, channel information based at least in part on the received power at the UE for the SSB transmission; and configuring one or more parameters for transmitting the one or more downlink transmissions based at least in part on the channel information and the difference between the default transmission power and the indicated transmission power for the SSB transmission.

Aspect 28: The method of any of aspects 16 through 27, wherein transmitting the indication of the transmission power comprises: transmitting MIB signaling, SIB signaling, RRC signaling, DCI signaling, or any combination thereof that comprises the indication of the transmission power.

Aspect 29: The method of any of aspects 16 through 28, wherein the transmission power corresponds to a respective EPRE value for the SSB transmission from the base station.

Aspect 30: An apparatus for wireless communication at a UE, comprising a processor, a transceiver coupled with the processor; and memory coupled with the processor, the memory and the processor configured to cause the apparatus to perform a method of any of aspects 1 through 15.

Aspect 31: An apparatus for wireless communication at a UE, comprising at least one means for performing a method of any of aspects 1 through 15.

Aspect 32: A non-transitory computer-readable medium storing code for wireless communication at a UE, the code comprising instructions executable by a processor to perform a method of any of aspects 1 through 15.

Aspect 33: An apparatus for wireless communication at a base station, comprising a processor, a transceiver coupled with the processor; and memory coupled with the processor, the memory and the processor configured to cause the apparatus to perform a method of any of aspects 16 through 29.

Aspect 34: An apparatus for wireless communication at a base station, comprising at least one means for performing a method of any of aspects 16 through 29.

Aspect 35: A non-transitory computer-readable medium storing code for wireless communication at a base station, the code comprising instructions executable by a processor to perform a method of any of aspects 16 through 29.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
receiving an indication of a transmission power for a synchronization signal block transmission by a base station, the indicated transmission power different than a default transmission power for synchronization signal block transmissions by the base station;

determining a received power with which the synchronization signal block transmission is received at the UE; and
receiving one or more downlink transmissions from the base station based at least in part on the received power for the synchronization signal block transmission and a difference between the default transmission power and the indicated transmission power for the synchronization signal block transmission.

2. The method of claim 1, further comprising:
receiving, from the base station, signaling that indicates a plurality of power modes for the base station, wherein the indication of the transmission power identifies a power mode of the plurality of power modes.

3. The method of claim 2, wherein the power mode corresponds to the difference between the default transmission power and the indicated transmission power, a configuration of antenna panels or subpanels, a quantity of transmission beams, a pattern of transmission beams, or any combination thereof, for a set of synchronization signal block transmissions by the base station that includes the synchronization signal block transmission.

4. The method of claim 1, wherein the indication of the transmission power or additional signaling received by the UE comprises an indication of a quantity of antenna panels or subpanels used by the base station for the synchronization signal block transmission.

5. The method of claim 4, wherein the indication of the quantity of antenna panels or subpanels or second additional signaling received by the UE indicates a respective identifier associated with each antenna panel or subpanel included in the quantity of antenna panels or subpanels.

6. The method of claim 1, wherein receiving the indication of the transmission power comprises:
receiving an indication of a power offset for the synchronization signal block transmission from the base station, the power offset corresponding to the difference between the indicated transmission power and the default transmission power.

7. The method of claim 1, further comprising:
receiving, from the base station, an indication of a time for a change from the indicated transmission power to a second transmission power for subsequent synchronization signal block transmissions by the base station, wherein the indication of the time for the change indicates at least one of a start time for the second transmission power, a duration of time until the change, a quantity of symbols until the change, a quantity of slots until the change, a quantity of frames until the change, or any combination thereof.

8. The method of claim 1, further comprising:
receiving, from the base station, signaling that indicates a second transmission power for synchronization signal block transmissions by a candidate cell available for handover of the UE; and
receiving a synchronization signal block transmission from the candidate cell according to the second transmission power.

9. The method of claim 8, wherein:
the signaling that indicates the second transmission power comprises radio resource control signaling, medium access control-control element signaling, downlink control information signaling, or any combination thereof; and
the signaling that indicates the second transmission power is received based at least in part on a periodic schedule, based at least in part on a change to the second transmission power by the candidate cell, based at least in part on a system information request transmitted by the UE, or any combination thereof.

10. The method of claim 1, further comprising:
transmitting, to the base station, channel information based at least in part on the received power at the UE for the synchronization signal block transmission, wherein receiving the one or more downlink transmissions based at least in part on the received power and the difference between the default transmission power and the indicated transmission power for the synchronization signal block transmission comprises:
receiving a downlink transmission based at least in part on one or more transmission or reception parameters that are based at least in part on the channel information and the difference between the default transmission power and the indicated transmission power for the synchronization signal block transmission.

11. The method of claim 1, further comprising:
receiving an indication of a power offset for a downlink transmission of the one or more downlink transmissions, the power offset relative to the default transmission power for the synchronization signal block transmission, wherein receiving the one or more downlink transmissions based at least in part on the received power and the difference between the default transmission power and the indicated transmission power for the synchronization signal block transmission comprises:
receiving the downlink transmission based at least in part on the indicated power offset for the downlink transmission, the received power for the synchronization signal block, and the difference between the default transmission power and the indicated transmission power for the synchronization signal block.

12. The method of claim 1, wherein receiving the indication of the transmission power comprises:
receiving master information block signaling, system information block signaling, radio resource control signaling, downlink control information signaling, or any combination thereof that comprises the indication of the transmission power.

13. The method of claim 1, wherein the indicated transmission power corresponds to an energy per-resource element for the synchronization signal block transmission.

14. A method for wireless communication at a base station, comprising:
transmitting, to a user equipment (UE), an indication of a transmission power for a synchronization signal block transmission by the base station, the indicated transmission power different than a default transmission power for synchronization signal block transmissions by the base station;
transmitting the synchronization signal block transmission at a transmit power level corresponding to the indicated transmission power; and
transmitting one or more downlink transmissions to the UE based at least in part on a received power at the UE for the synchronization signal block transmission and a difference between the default transmission power and the indicated transmission power for the synchronization signal block transmission.

15. The method of claim 14, further comprising:
transmitting, to the UE, signaling that indicates a plurality of power modes for the base station, wherein the indication of the transmission power identifies a power mode of the plurality of power modes.

16. The method of claim 15, wherein the power mode corresponds to the difference between the default transmission power and the indicated transmission power, a configuration of antenna panels or subpanels, a quantity of transmission beams, a pattern of transmission beams, or any combination thereof, for a set of synchronization signal block transmissions by the base station that includes the synchronization signal block transmission.

17. The method of claim 14, wherein:
the indication of the transmission power or additional signaling transmitted to the UE comprises an indication of a quantity of antenna panels or subpanels used by the base station for the synchronization signal block transmission; and
the indication of the quantity of antenna panels or subpanels or second additional signaling transmitted to the UE indicates a respective identifier associated with each antenna panel or subpanel included in the quantity of antenna panels or subpanels.

18. The method of claim 14, wherein transmitting the indication of the transmission power comprises:
transmitting, to the UE, an indication of a power offset for the synchronization signal block transmission from the base station, the power offset corresponding to the difference between the indicated transmission power and the default transmission power.

19. The method of claim 14, further comprising:
transmitting, to the UE, an indication of a time for a change from the indicated transmission power to a second transmission power for subsequent synchronization signal block transmissions by the base station.

20. The method of claim 14, further comprising:
transmitting, to the UE, signaling that indicates a second transmission power for synchronization signal block transmissions by a candidate cell available for handover of the UE.

21. The method of claim 14, wherein transmitting the one or more downlink transmissions based at least in part on the received power and the difference between the default transmission power and the indicated transmission power for the synchronization signal block transmission comprises:
receiving, from the UE, channel information based at least in part on the received power at the UE for the synchronization signal block transmission; and
configuring one or more parameters for transmitting the one or more downlink transmissions based at least in part on the channel information and the difference between the default transmission power and the indicated transmission power for the synchronization signal block transmission.

22. An apparatus for wireless communication, comprising:
a processor of a user equipment (UE);
a transceiver coupled with the processor; and
memory coupled with the processor, the memory and the processor configured to cause the apparatus to:
receive, via the transceiver, an indication of a transmission power for a synchronization signal block transmission by a base station, the indicated transmission power different than a default transmission power for synchronization signal block transmissions by the base station;
determine a received power with which the synchronization signal block transmission is received at the UE; and
receive, via the transceiver, one or more downlink transmissions from the base station based at least in part on the received power for the synchronization signal block transmission and a difference between the default transmission power and the indicated transmission power for the synchronization signal block transmission.

23. The apparatus of claim 22, the memory and the processor further configured to cause the apparatus to:
receive, from the base station via the transceiver, signaling that indicates a plurality of power modes for the base station, wherein the indication of the transmission power identifies a power mode of the plurality of power modes.

24. The apparatus of claim 23, wherein the power mode corresponds to the difference between the default transmission power and the indicated transmission power, a configuration of antenna panels or subpanels, a quantity of transmission beams, a pattern of transmission beams, or any combination thereof, for a set of synchronization signal block transmissions by the base station that includes the synchronization signal block transmission.

25. The apparatus of claim 22, wherein the indication of the transmission power or additional signaling received by the UE comprises an indication of a quantity of antenna panels or subpanels used by the base station for the synchronization signal block transmission.

26. The apparatus of claim 22, wherein the indication of the quantity of antenna panels or subpanels or second additional signaling received by the UE indicates a respective identifier associated with each antenna panel or subpanel included in the quantity of antenna panels or subpanels.

27. The apparatus of claim 22, wherein, to receive the indication of the transmission power, the memory and the processor are configured to cause the apparatus to:
receive an indication of a power offset for the synchronization signal block transmission from the base station, the power offset corresponding to the difference between the indicated transmission power and the default transmission power.

28. The apparatus of claim 22, the memory and the processor further configured to cause the apparatus to:
receive, from the base station, an indication of a time for a change from the indicated transmission power to a second transmission power for subsequent synchronization signal block transmissions by the base station, wherein the indication of the time for the change indicates at least one of a start time for the second transmission power, a duration of time until the change, a quantity of symbols until the change, a quantity of slots until the change, a quantity of frames until the change, or any combination thereof.

29. An apparatus for wireless communication, comprising:
a processor of a base station;
a transceiver coupled with the processor; and
memory coupled with the processor, the memory and the processor configured to cause the apparatus to:
transmit, to a user equipment (UE) via the transceiver, an indication of a transmission power for a synchronization signal block transmission by the base station, the indicated transmission power different than a default transmission power for synchronization signal block transmissions by the base station;
transmit, via the transceiver, the synchronization signal block transmission at a transmit power level corresponding to the indicated transmission power; and transmit, via the transceiver, one or more downlink transmissions to the UE based at least in part on a received power at the UE for the synchronization signal block transmission and a difference between the default transmission power and the indicated transmission power for the synchronization signal block transmission.

30. The apparatus of claim 29, the memory and the processor further configured to cause the apparatus to:
transmit, to the UE via the transceiver, signaling that indicates a plurality of power modes for the base station, wherein the indication of the transmission power identifies a power mode of the plurality of power modes.

* * * * *